(12) United States Patent
Doi et al.

(10) Patent No.: US 11,820,000 B2
(45) Date of Patent: Nov. 21, 2023

(54) END EFFECTOR AND END EFFECTOR DEVICE

(71) Applicant: OMRON Corporation, Kyoto (JP)

(72) Inventors: Sayaka Doi, Joyo (JP); Hiroki Koga, Nara (JP); Misato Nabeto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 62 days.

(21) Appl. No.: 17/273,506

(22) PCT Filed: Mar. 12, 2019

(86) PCT No.: PCT/JP2019/009911
§ 371 (c)(1),
(2) Date: Mar. 4, 2021

(87) PCT Pub. No.: WO2020/066064
PCT Pub. Date: Apr. 2, 2020

(65) Prior Publication Data
US 2021/0206004 A1   Jul. 8, 2021

(30) Foreign Application Priority Data

Sep. 25, 2018  (JP) ................................. 2018-179295

(51) Int. Cl.
*B25J 15/10* (2006.01)
*B25J 13/08* (2006.01)
*B25J 9/16* (2006.01)

(52) U.S. Cl.
CPC ........... *B25J 13/086* (2013.01); *B25J 9/1612* (2013.01); *B25J 15/10* (2013.01)

(58) Field of Classification Search
CPC . B25J 13/086; B25J 15/08; B25J 15/10; B25J 19/1612; Y10S 294/907; Y10S 901/35; Y10S 901/46
See application file for complete search history.

(56) References Cited

U.S. PATENT DOCUMENTS 4,747,458 A * 5/1988 Andre .................. G05D 1/0255
 901/9
4,766,322 A * 8/1988 Hashimoto ............ B25J 19/021
 414/730

(Continued)

FOREIGN PATENT DOCUMENTS

CN 204673624 U 9/2015
DE 4006119 A1 8/1991

(Continued)

OTHER PUBLICATIONS

EPO Extended European Search Report for corresponding EP Application No. 19865929.4; dated Apr. 26, 2022.

(Continued)

*Primary Examiner* — Dean J Kramer
(74) *Attorney, Agent, or Firm* — CANTOR COLBURN LLP

(57) ABSTRACT

An end effector includes a palm and a plurality of fingers capable of moving in a direction intersecting an extending direction of each of fingers as well as approaching each other and grasping and object being grasped. At least one of the plurality of fingers includes a proximity sensor unit provided at a tip portion in the extending direction, the proximity sensor unit being placed capable of detecting approach and separation of the proximity sensor unit with respect to an object in the extending direction and capable of detecting approach and separation of the object with respect to the proximity sensor unit in the extending direction. The proximity sensor unit includes a frame shaped detection region that covers an edge of the tip portion when viewed from the extending direction.

20 Claims, 15 Drawing Sheets

(56) References Cited

U.S. PATENT DOCUMENTS

| | | | |
|---|---|---|---|
| 5,539,292 A | 7/1996 | Vranish | |
| 7,031,807 B2 | 4/2006 | Heiligensetzer et al. | |
| 7,259,573 B2 * | 8/2007 | Andrade | G01D 5/24 |
| | | | 324/678 |
| 2013/0342224 A1 * | 12/2013 | Frangen | G01L 1/146 |
| | | | 324/658 |
| 2015/0336280 A1 | 11/2015 | Usami | |

FOREIGN PATENT DOCUMENTS

| | | |
|---|---|---|
| JP | S63305074 A | 12/1988 |
| JP | H04240087 A | 8/1992 |
| JP | H04125586 U | 11/1992 |
| JP | H064877 A | 1/1994 |
| JP | H08141956 A | 6/1996 |
| JP | 2015222738 A | 12/2015 |
| KR | 101013540 B1 | 2/2011 |

OTHER PUBLICATIONS

Hirzinger et al., "Sensor-Based Space Robotics—ROTEX and Its Telerobotic Features", IEEE Inc.; IEEE Transactions on Robotics and Automation, vol. 9, No. 5, Oct. 1, 1993, pp. 649-663.

International Search Report for International Application No. PCT/JP2019/009911; dated Apr. 23, 2019.

PCT Written Opinion of the International Searching Authority for International Application No. PCT/JP2019/009911; dated Apr. 23, 2019.

S. E. Navarro et al., "6D Proximity Servoing for Preshaping and Haptic Exploration Using Capacitive Tactile Proximity Sensors", IEEE/RSJ International Conference on Intelligent Robots and Systems, Dated Sep. 14-18, 2014; pp. 7-14.

* cited by examiner

END EFFECTOR AND END EFFECTOR DEVICE

CROSS REFERENCE TO RELATED APPLICATIONS

This is the U.S. national stage of application No. PCT/JP2019/009911, filed on Mar. 12, 2019. Priority under 35 U.S.C. § 119(a) and 35 U.S.C. § 365(b) is claimed from Japanese Application No. 2018-179295, filed Sep. 25, 2018, the disclosure of which is also incorporated herein by reference.

TECHNICAL FIELD

The present disclosure relates to an end effector and an end effector device comprising the end effector.

BACKGROUND ART

Non Patent Literature 1 discloses a robot system provided with a grasping unit. In this robot system, the grasping unit has two plate-shaped fingers that are arranged to face each other and movable to approach and separate from each other. Each of the fingers has a proximity sensor provided on a surface facing each other.

CITATION LIST

Non Patent Literature

NPL 1: "6D Proximity Servoing for Preshaping and Haptic Exploration Using Capacitive Tactile Proximity Sensors", Stefan Escaida Navarro, Martin Schonert, Bj"orn Hein and Heinz W"orn, 2014 IEEE/RSJ International Conference on Intelligent Robots and Systems (IROS 2014), Sep. 14-18, 2014, Chicago, Ill., USA

SUMMARY OF INVENTION

Technical Problem

In the robot system, since proximity sensors are provided on the surfaces of the respective fingers facing each other, it is possible to detect approach and separation of an object positioned between the fingers. However, since the robot system has no sensor provided in an extending direction of each finger, for example, an object approaching a tip of each finger from the extending direction of each finger cannot be detected. As a result, when the grasping unit moves in the extending direction of the finger, each finger may come into contact with an object approaching from the extending direction of the finger and get damaged.

Therefore, the present disclosure provides an end effector and an end effector device capable of detecting the approach and separation of an object with respect to a tip portion of a finger, and also capable of detecting approach and separation of a tip portion of a finger with respect to an object.

Solution to Problem

The end effector of an example of the present disclosure includes:
a palm; and
a plurality of fingers capable of moving in a direction intersecting an extending direction of each of fingers as well as approaching each other and grasping an object being grasped, each of which includes a proximal end portion in an extending direction thereof connected to the palm, wherein at least one of the plurality of fingers includes a proximity sensor unit provided at a tip portion in the extending direction, the proximity sensor unit being placed capable of detecting approach and separation of the proximity sensor unit with respect to an object in the extending direction and capable of detecting approach and separation of the object with respect to the proximity sensor unit in the extending direction, and the proximity sensor unit includes a frame-shaped detection region that covers an edge of the tip portion when viewed from the extending direction.

The end effector device of an example of the present disclosure includes the end effector,
a drive device that drives the palm and each of the plurality of fingers, and
a control device that controls the drive device based on a detection result detected by the proximity sensor unit.

Advantageous Effects of Invention

According to the end effector, at least one of the fingers includes the proximity sensor unit at the tip portion in the extending direction thereof. The proximity sensor unit includes the frame-shaped detection region that covers the edge of the tip portion of each finger when viewed from the extending direction of each finger. With this proximity sensor unit, it is possible to realize an end effector capable of detecting approach and separation of an object with respect to a tip portion of each finger in an extending direction of each finger, and capable of detecting approach and separation of a tip portion of each finger with respect to an object in the extending direction of each finger.

According to the end effector device, with the end effector, it is possible to realize an end effector device capable of detecting approach and separation of an object with respect to a tip portion of each finger in an extending direction of each finger, and capable of detecting approach and separation of a tip portion of each finger with respect to an object in the extending direction of each finger.

DESCRIPTION OF EMBODIMENTS

Hereinafter, an example of the present disclosure will be described with reference to the accompanying drawings. Note that, in the following description, although terms indicating a specific direction or position (for example, terms including "up", "down", "right", "left") will be used as necessary, they are used for facilitating understanding of the present disclosure with reference to the drawings, and the technical scope of the present disclosure is not limited by the meaning of those terms. It should be noted that the following description is merely exemplary in nature and is not intended to limit the present disclosure, its application, or its use. Furthermore, the drawings are schematic, and the ratios of the dimensions do not always match actual ones.

Figure 1:
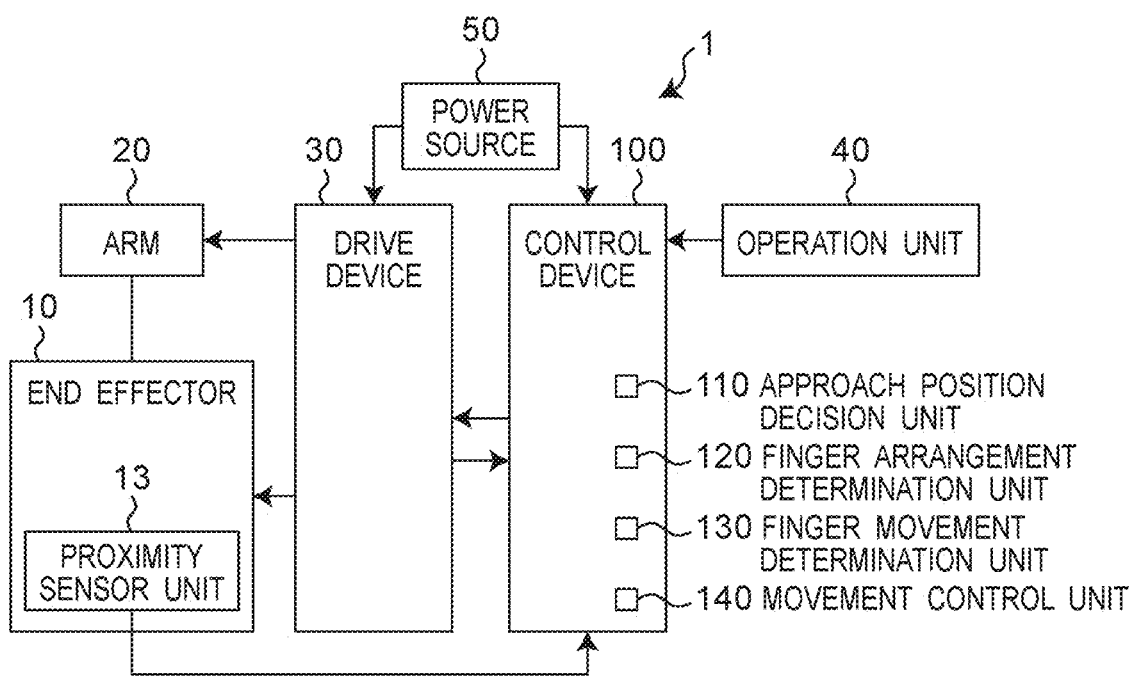
FIG. 1 is a block diagram showing an end effector device according to an embodiment of the present disclosure.

An end effector 10 of an embodiment of the present disclosure constitutes a part of an end effector device 1 such as a manipulator, for example, as shown in FIG. 1. As an example, the end effector device 1 includes an end effector 10, an arm 20 connected to the end effector 10, a drive device 30 that drives the end effector 10 and the arm 20, a control device 100 that controls the drive device 30, an operation unit 40 connected to the control device 100, and a power source 50 that supplies power to the drive device 30 and the control device 100. The control device 100 controls drive of the end effector 10 and the arm 20 by outputting a command to the drive device 30 based on operation received by the operation unit 40. The arm 20 is connected to a palm 11 described later of the end effector 10, and can move to be able to arbitrarily change a position and posture of the end effector 10 by the drive device 30. The drive device 30 includes a motor (not shown) for driving the palm 11 and each finger 12, and an encoder (not shown) for detecting a rotation of the motor. The drive device 30 is configured to output information detected by the encoder to the control device 100.

Figure 2:
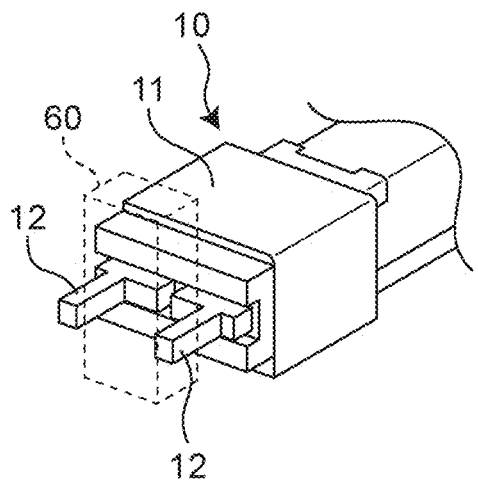
FIG. 2 is a perspective view showing an end effector according to an embodiment of the present disclosure.
Figure 4:
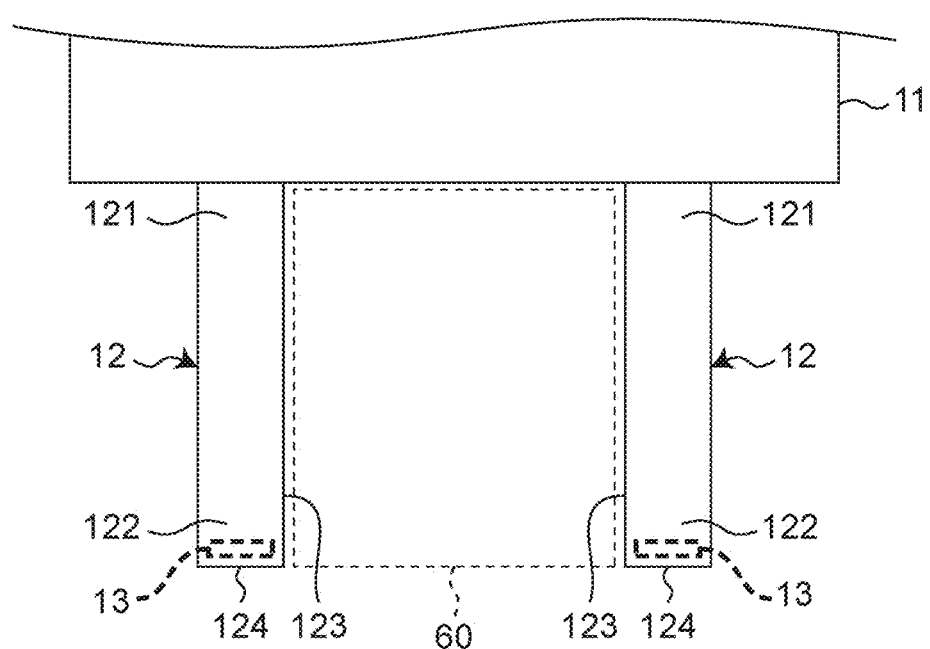
FIG. 4 is a plan view of the end effector of FIG. 2.

As shown in FIG. 2, the end effector 10 includes a palm 11 and a plurality of fingers 12 (in this embodiment, two fingers 12) connected to the palm 11. Each finger 12 includes a proximal end portion 121 (see FIG. 4) in an extending direction thereof, the proximal end portion 121 being connected to the palm 11. Each finger 12 is configured capable of moving in a direction intersecting the extending direction of each finger 12 as well as approaching each other and capable of grasping operation of grasping an object being grasped 60.

As an example, each finger 12, which has a substantially rectangular plate shape, is placed so that its plate surface faces another plate surface. Each finger 12 is configured to be movable in a direction orthogonal to the plate surface by the drive device 30. That is, surfaces of the fingers 12 facing each other constitute grasping surfaces 123 (see FIG. 4), each grasping surface 123 intersecting (for example, orthogonal to) the extending direction of each finger 12 and facing the object being grasped 60. The motor that drives each finger 12 may be configured by, for example, a linear motor.

Figure 3:
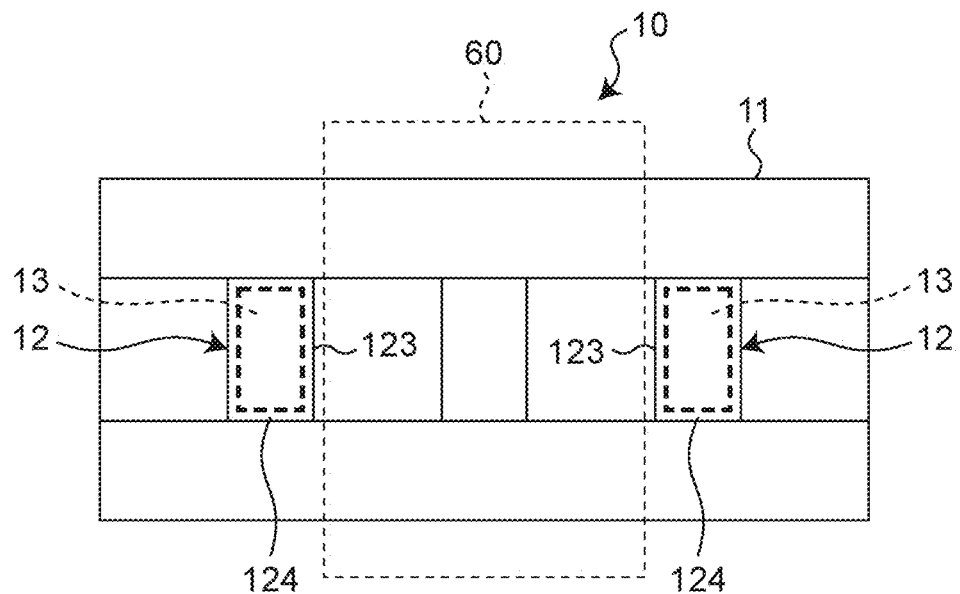
FIG. 3 is a front view of the end effector of FIG. 2.

As shown in FIG. 3, each finger 12 includes a proximity sensor unit 13 provided at a tip portion 122 (see FIG. 4) in the extending direction thereof. As an example, each proximity sensor unit 13 is configured by a capacitive proximity sensor. Each proximity sensor unit 13 is configured capable of detecting approach and separation of the proximity sensor unit 13 with respect to an object in the extending direction of each finger 12 and capable of detecting approach and separation of an object with respect to the proximity sensor unit 13 in the extending direction of each finger 12.

Figure 5:
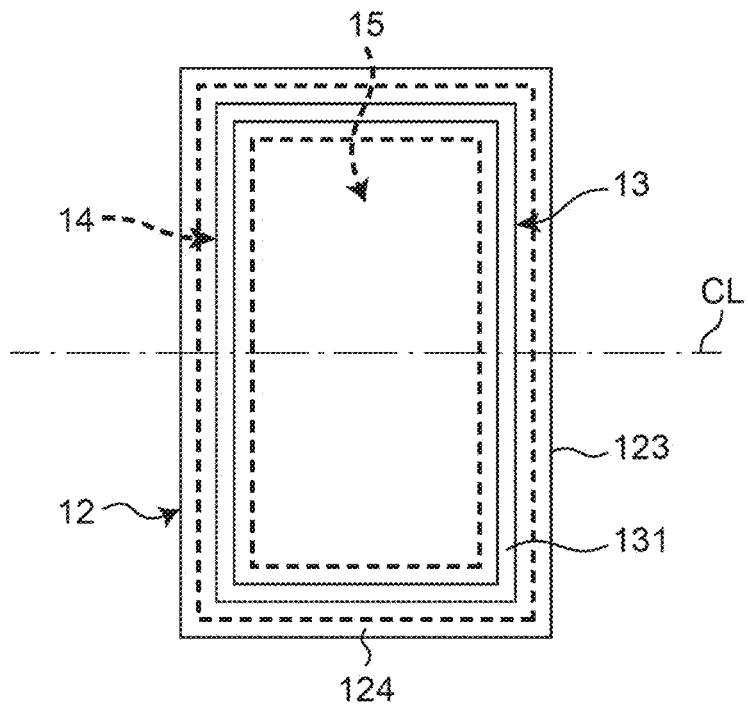
FIG. 5 is an enlarged front view of a tip portion of a finger in the end effector of FIG. 2.

Specifically, as shown in FIG. 5, each proximity sensor unit 13 includes a frame-shaped electrode 131 placed along an edge of a substantially rectangular tip surface 124 of each finger 12 when viewed from the extending direction of each finger 12. The electrode 131 is placed symmetrically with respect to a centerline CL that is orthogonal to the grasping surface 123 and passes through a center of the grasping surface 123. That is, the electrode 131 forms a first detection region 14 that covers the edge of the tip surface 124 of each finger 12 and a second detection region 15 that is placed inside the first detection region 14. The first detection region 14 and the second detection region 15 cover substantially the entire tip surface 124 of each finger 12.

In the end effector 10, a length of each finger 12 in the extending direction thereof is substantially the same. The tip surface 124 of each finger 12 is placed on the same plane orthogonal to the extending direction of each finger 12. That is, the proximity sensor unit 13 of each finger 12 is placed so that a distance of each finger 12 with respect to an object being grasped 60 in the extending direction of each finger 12 is substantially the same.

Figure 20:
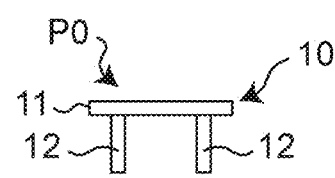
FIG. 20 is a first schematic diagram for illustrating each part constituting a control device of the end effector device of FIG. 1.
Figure 20:
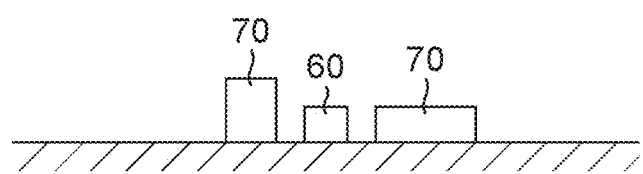

According to the end effector 10, each finger 12 includes the proximity sensor unit 13 at the tip portion in the extending direction thereof, and this proximity sensor unit 13 includes the frame-shaped first detection region 14 that covers the edge of the tip portion 122 in the extending direction of each finger 12 when viewed from the extending direction of each finger 12. With this proximity sensor unit 13, it is possible to realize the end effector 10 capable of detecting approach and separation of an object (for example, the object being grasped 60 shown in FIG. 20 or an object 70 in a surrounding environment) with respect to the tip portion 122 of each finger 12 in the extending direction of each finger 12, and capable of detecting approach and separation of the tip portion 122 of each finger with respect to an object in the extending direction of each finger 12.

Since the proximity sensor unit 13 includes the frame-shaped first detection region 14 that covers the edge of the tip portion 122 in the extending direction of each finger 12, it is possible to detect, at an arbitrary position of the edge of the tip portion 122 of each finger 12, approach or separation of the object being grasped 60 or the object 70 in the surrounding environment and a positional relationship between each finger 12 and an object in the extending direction of each finger 12 with high accuracy. As a result, for example, when the end effector 10 approaches toward the object being grasped 60, it is possible to calculate with high accuracy whether each finger 12 can approach the object being grasped 60 without contacting the object being grasped 60.

The proximity sensor unit 13 is configured by a capacitive proximity sensor. Thereby, with a simple configuration, it is possible to detect approach and separation of an object with respect to the tip portion 122 of each finger 12 in the extending direction of each finger 12, and detect approach and separation of the tip portion 122 of each finger 12 with respect to the object in the extending direction of each finger 12.

The proximity sensor unit 13 includes the frame-shaped electrode 131 placed at the edge of the tip portion 122 of each finger 12 when viewed from the extending direction of each finger 12. Thereby, with a simple configuration, it is possible to detect approach and separation of an object with respect to the tip portion 122 of each finger 12 in the extending direction of each finger 12, and detect approach and separation of the tip portion 122 of each finger with respect to an object in the extending direction of each finger 12.

According to the end effector device 1, with the end effector 10, it is possible to realize the end effector device 1 capable of detecting approach and separation of an object with respect to the tip portion 122 of each finger 12 in the extending direction of each finger 12, and capable of detecting approach and separation of the tip portion 122 of each finger 12 with respect to an object in the extending direction of each finger 12.

Figure 6:
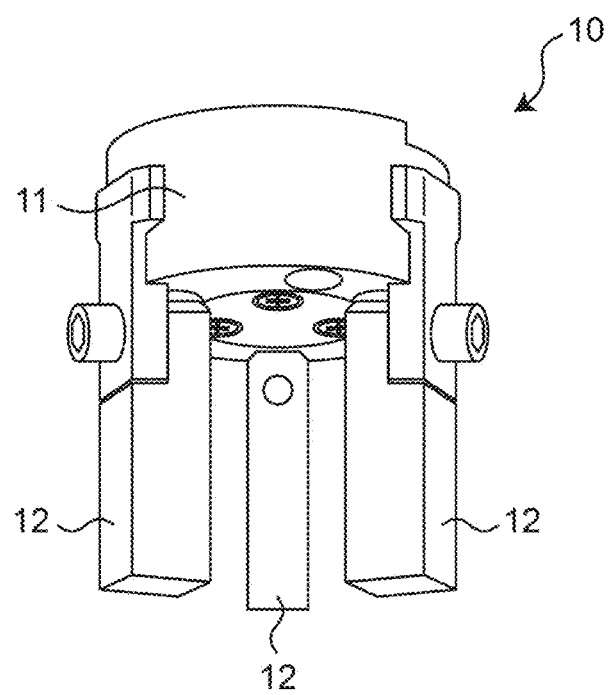
FIG. 6 is a perspective view showing a first modification of the end effector of FIG. 2.

The end effector 10 may include a plurality of fingers 12, and is not limited to a case where it includes two fingers 12. For example, as shown in FIG. 6, the end effector 10 may be configured to include three fingers 12.

Figure 7:
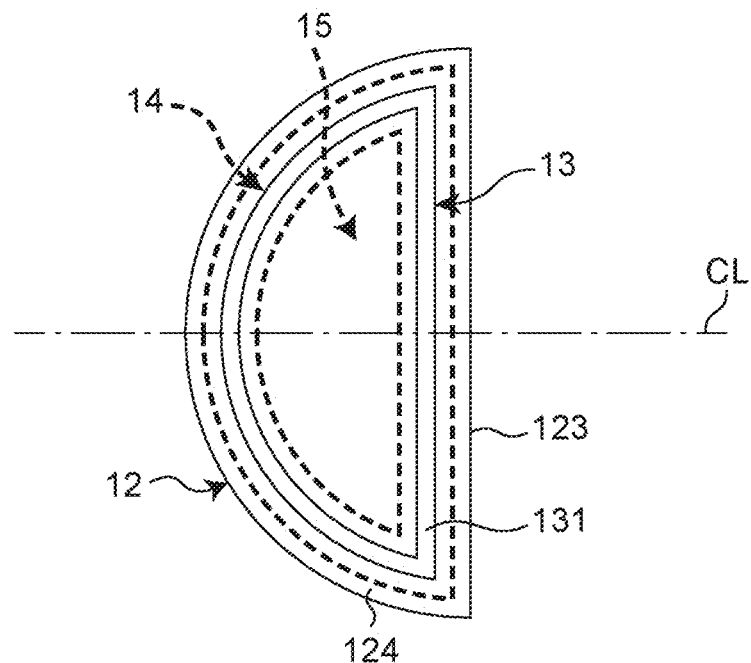
FIG. 7 is a perspective view showing a second modification of the end effector of FIG. 2.
Figure 8:
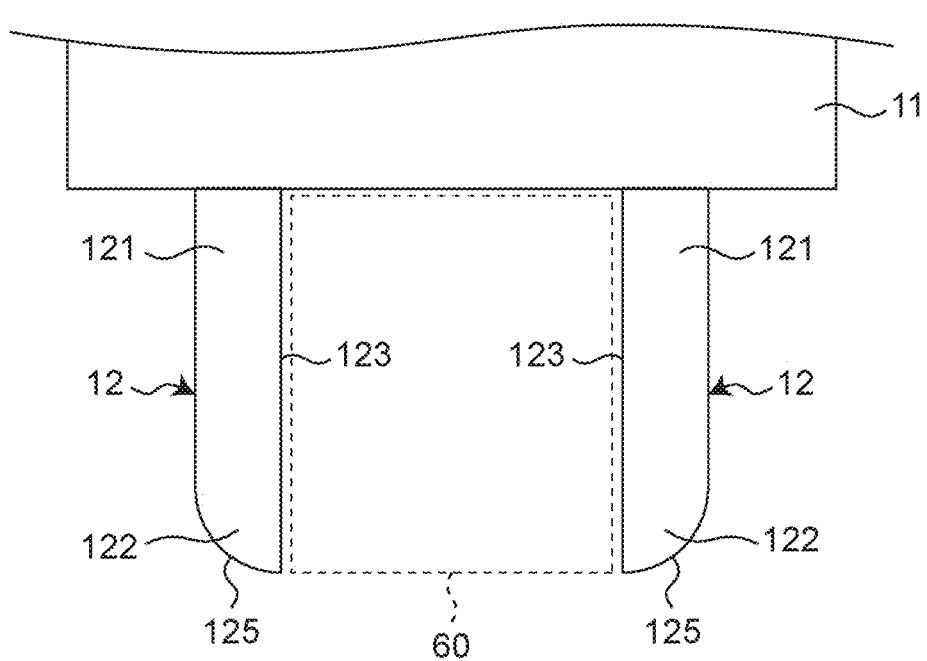
FIG. 8 is a perspective view showing a third modification of the end effector of FIG. 2.
Figure 9:
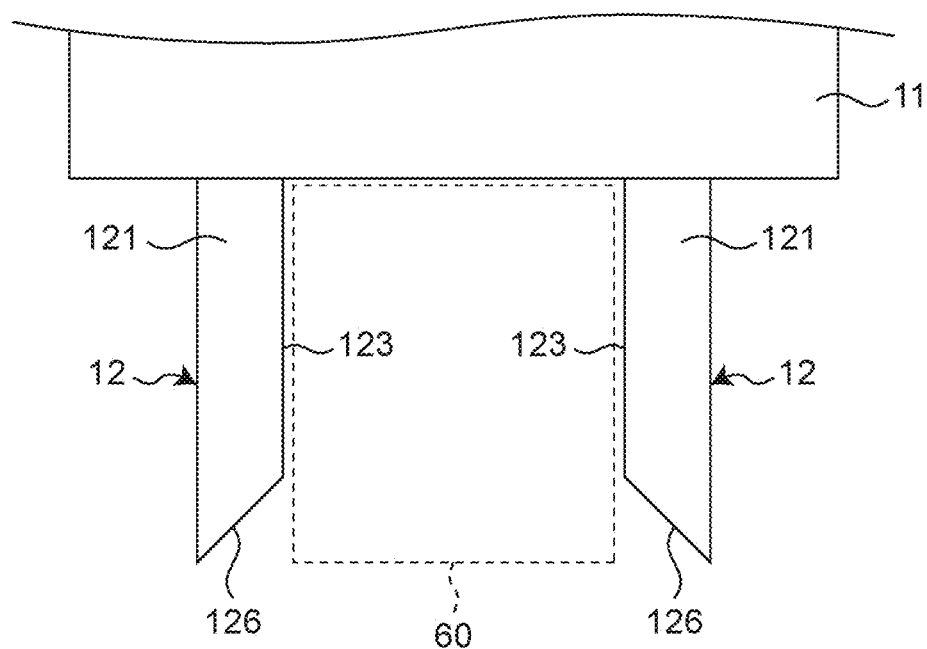
FIG. 9 is a perspective view showing a fourth modification of the end effector of FIG. 2.

The tip portion 122 of each finger 12 is not limited to a case where the tip portion 122 has a substantially rectangular shape when viewed from the extending direction of each finger 12. For example, as shown in FIG. 7, the tip portion 122 of each finger 12 may be configured to have an arc shape when viewed from the extending direction of each finger 12. The end surface 124 of the tip portion 122 is not limited to a case where the end surface 124 is configured by a plane orthogonal to the extending direction of the finger. For example, as shown in FIGS. 8 and 9, the end surface 124 of the tip portion 122 may be configured by a curved surface 125 projecting toward the tip portion 122 in the extending direction of each finger 12, or may be configured by an inclined surface 126 that intersects the extending direction of each finger 12.

The proximity sensor unit 13 may be provided on at least one of the plurality of fingers 12, and is not limited to a case where it is provided on each of the plurality of fingers 12.

Further, the proximity sensor unit 13 is only required to have at least a first detection region 14, that is, a frame-shaped detection region that covers the edge of the tip portion 122 of each finger 12 when viewed from the extending direction of each finger, and is not limited to a case where the proximity sensor unit 13 is configured by a capacitive proximity sensor having a frame-shaped electrode 131. For example, as shown in FIGS. 10 to 18, the proximity sensor unit 13 may be configured by one or more capacitive sensors each including an electrode 131 that has an arbitrary shape.

Figure 10:
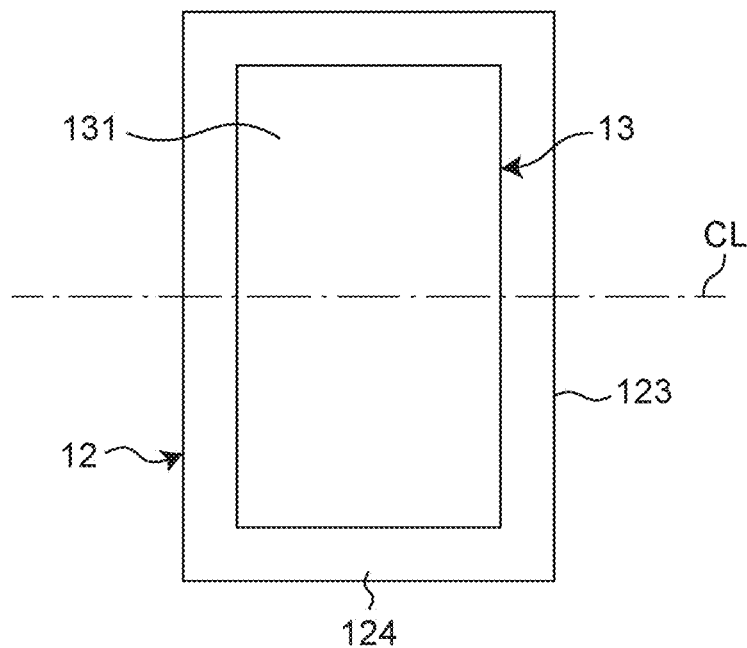
FIG. 10 is a perspective view showing a fifth modification of the end effector of FIG. 2.
Figure 11:
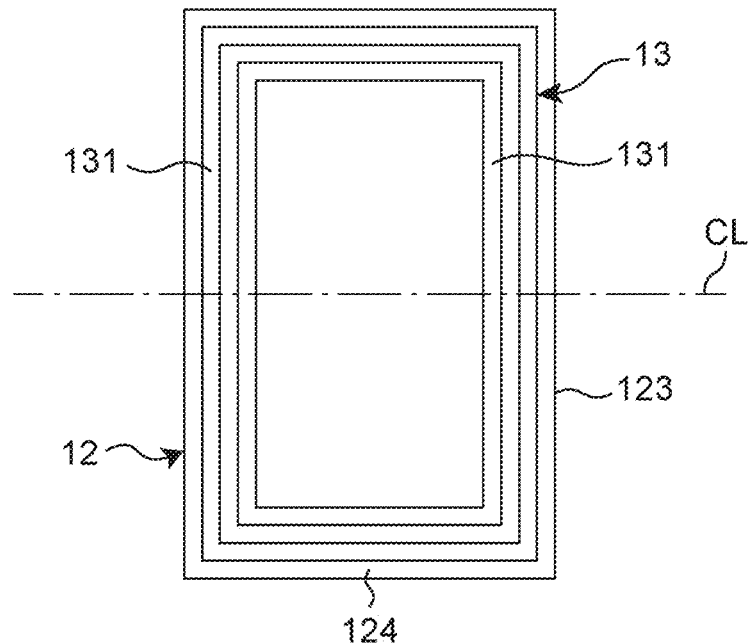
FIG. 11 is a perspective view showing a sixth modification of the end effector of FIG. 2.
Figure 12:
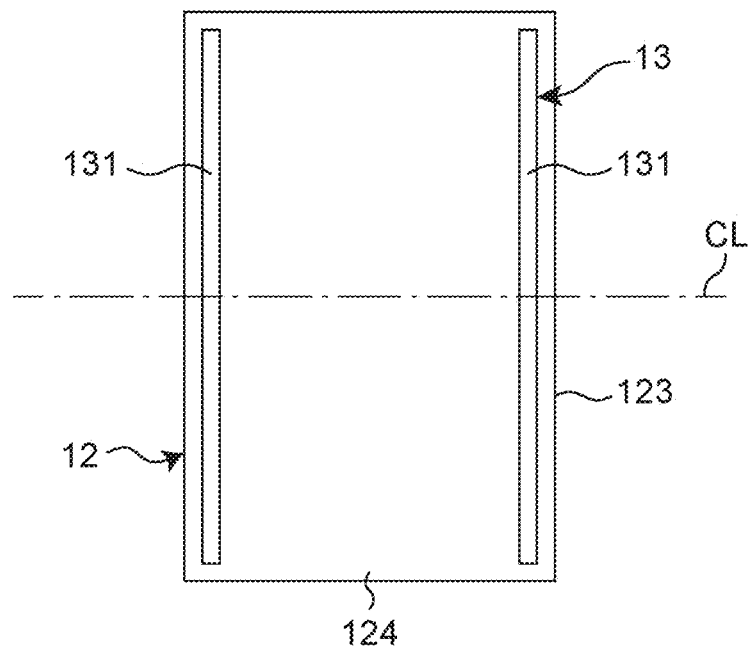
FIG. 12 is a perspective view showing a seventh modification of the end effector of FIG. 2.
Figure 13:
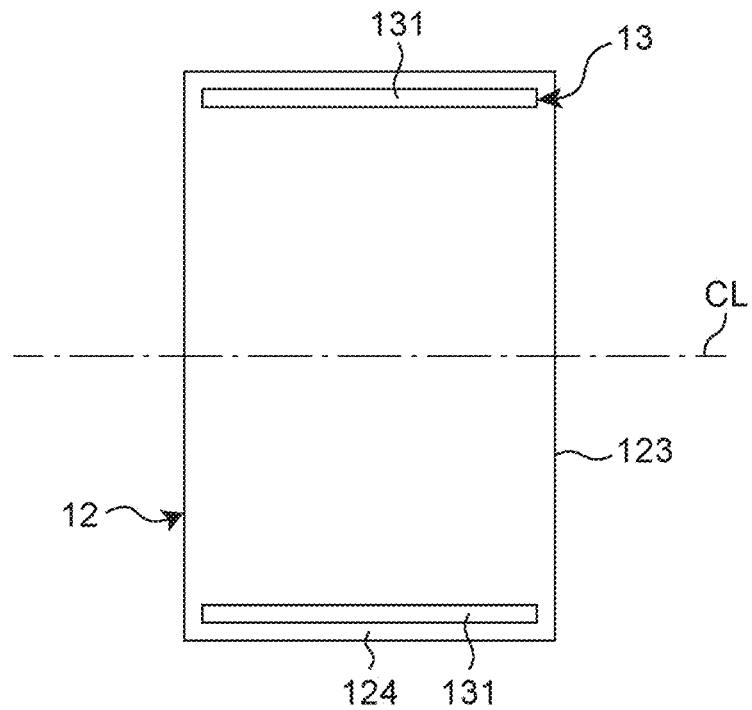
FIG. 13 is a perspective view showing an eighth modification of the end effector of FIG. 2.
Figure 14:
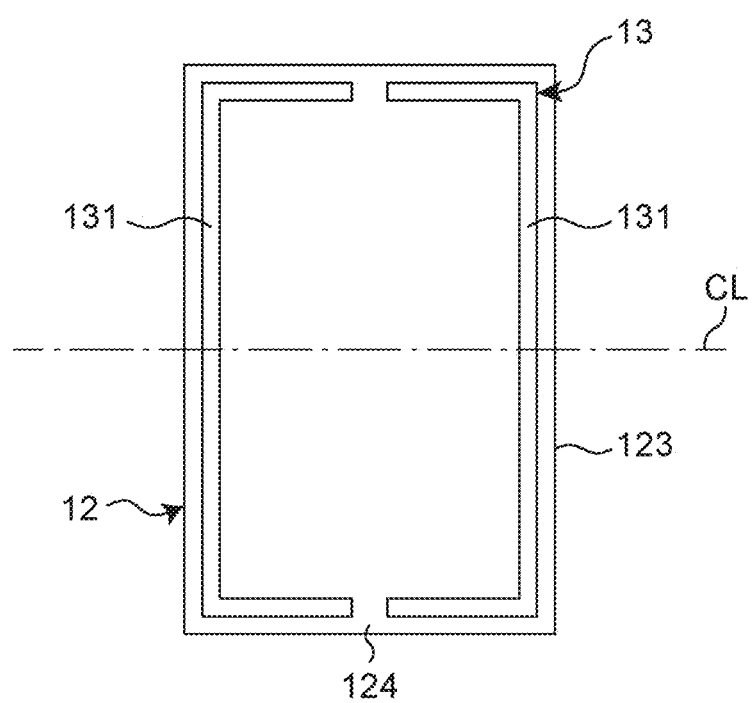
FIG. 14 is a perspective view showing a ninth modification of the end effector of FIG. 2.
Figure 15:
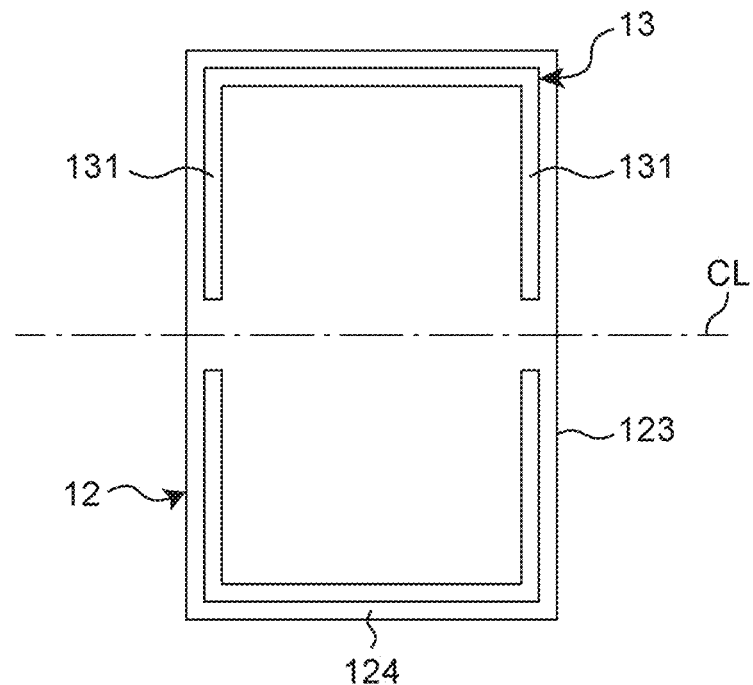
FIG. 15 is a perspective view showing a tenth modification of the end effector of FIG. 2.
Figure 16:
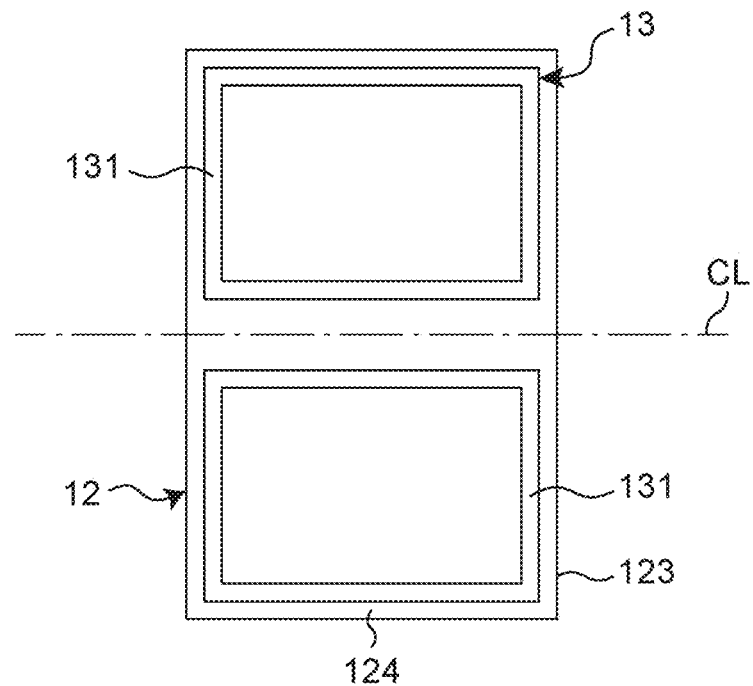
FIG. 16 is a perspective view showing an eleventh modification of the end effector of FIG. 2.
Figure 17:
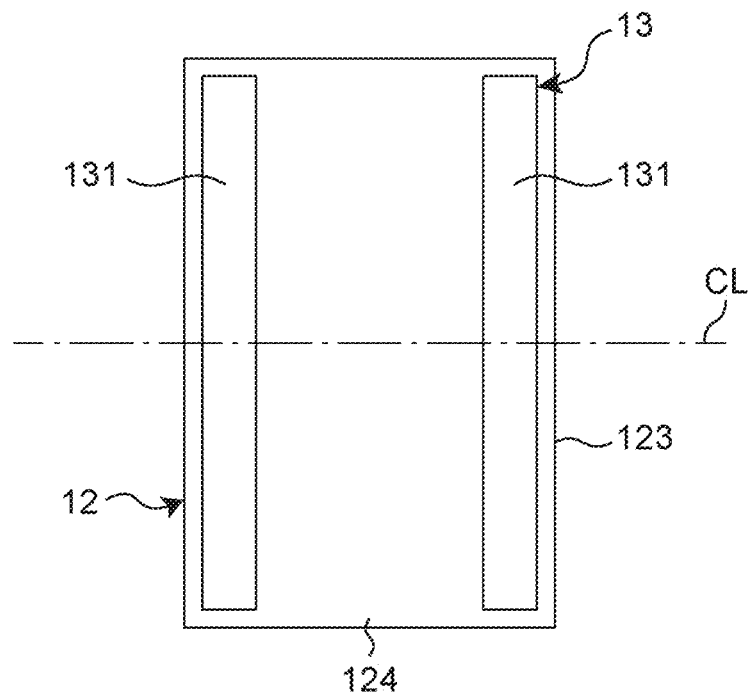
FIG. 17 is a perspective view showing a twelfth modification of the end effector of FIG. 2.
Figure 18:
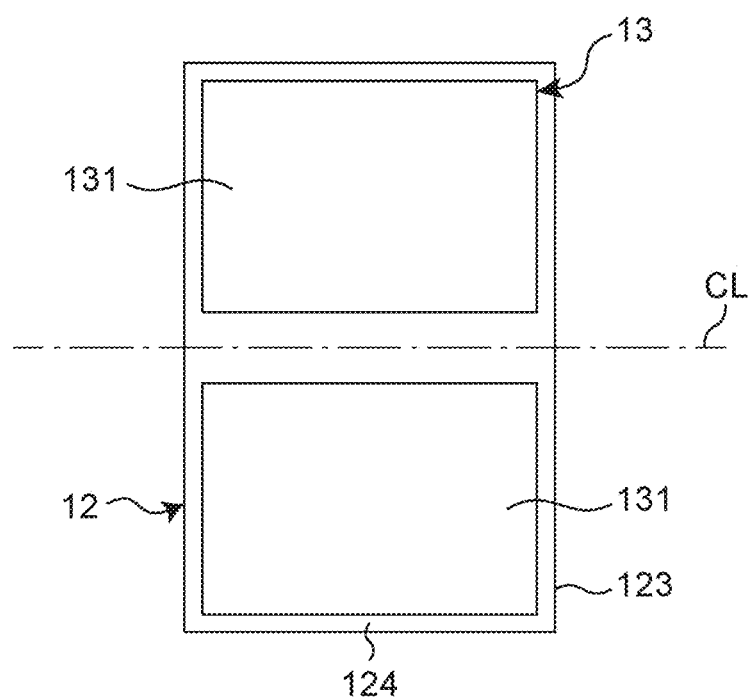
FIG. 18 is a perspective view showing a thirteenth modification of the end effector of FIG. 2.

The proximity sensor unit 13 of FIG. 10 is configured by one solid electrode 131 that covers substantially the entire tip surface 124 of each finger 12. The proximity sensor unit 13 of FIG. 11 is configured by two frame-shaped electrodes 131 having different sizes. One electrode 131 is placed inside the other electrode 131. The proximity sensor unit 13 of FIGS. 12 and 13 is configured by two linear electrodes 131 having the same size. The proximity sensor unit 13 of FIGS. 14 and 15 is configured by two substantially C-shaped electrodes 131 having the same size. The proximity sensor unit 13 of FIG. 16 is configured by two frame-shaped electrodes 131 having the same size. The proximity sensor unit 13 of FIGS. 17 and 18 is configured by two solid electrodes 131 having the same size. In the proximity sensor unit 13 of FIGS. 12, 14 and 17, each electrode 131 is placed along each of a pair of sides orthogonal to the centerline CL on the tip surface 124 of each finger 12. In the proximity sensor unit 13 of FIGS. 13, 15 and 18, each electrode 131 is placed along each of a pair of sides parallel to the centerline CL on the tip surface 124 of each finger 12.

In the proximity sensor unit 13 of FIGS. 11 to 18, each electrode 131 is placed symmetrically with respect to the centerline CL that is orthogonal to the grasping surface 123 and that passes through the center of the grasping surface 123 when viewed from the extending direction of each finger 12. In this way, the configuration of the proximity sensor unit 13 can be arbitrarily changed according to a dimensional configuration of each finger 12, a shape, size, and the like of the object being grasped 60, or the like, so that the end effector 10 having a high degree of freedom in design can be realized.

The proximity sensor unit 13 is not limited to the capacitive proximity sensor. The proximity sensor unit 13 may be configured by any type of proximity sensor such as an optical type, an inductive type, a magnetic type, or an ultrasonic type.

Since the proximity sensor unit 13 of FIGS. 5, 7 and 11 to 15 is configured by a loop electrode, a parasitic capacitance of the proximity sensor unit 13 can be reduced to increase the detection sensitivity. Since the proximity sensor unit 13 of FIGS. 10 and 16 to 18 is configured by a solid electrode, an electrode area can be increased to increase the detection sensitivity. Since the proximity sensor unit 13 of FIGS. 5, 7 and 10 is configured by a self-capacitive proximity sensor having a single electrode, the electrode area can be increased to increase the detection sensitivity. The proximity sensor unit 13 of FIGS. 11 to 18, which includes a plurality of electrodes, may be configured by a plurality of self-capacitive proximity sensors or one or more mutual-capacitive proximity sensors. For example, when the proximity sensor unit 13 shown in FIG. 12 is configured by a plurality of self-capacitive proximity sensors, the number of surface pixels in the detection region 14 can be increased. Therefore, when an edge portion of the object being grasped 60 or the object 70 in the surrounding environment is positioned in the detection region 14, it is possible to determine in which direction each finger 12 should move to avoid contact with the object being grasped 60 or the object 70 in the surrounding environment.

Figure 19:
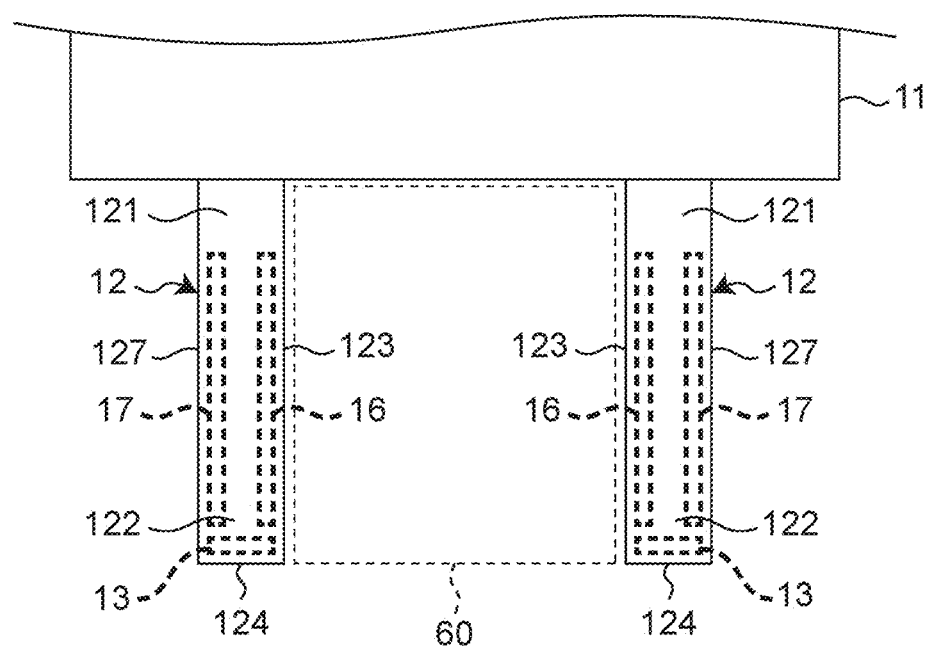
FIG. 19 is a perspective view showing a fourteenth modification of the end effector of FIG. 2.

As shown in FIG. 19, at least one of respective fingers 12 may be configured to include one or both of a first auxiliary proximity sensor unit 16 and a second auxiliary proximity sensor unit 17. The first auxiliary proximity sensor unit 16, which is provided on the grasping surface 123, is placed capable of detecting approach and separation of the object being grasped 60 with respect to the grasping surface 123. The first auxiliary proximity sensor unit 16 makes it possible more accurately to calculate the positional relationship between the grasping surface 123 of each finger 12 and the object being grasped 60 when the object being grasped 60 is grasped. The second auxiliary proximity sensor unit 17, which is provided on a surface 127 opposite to the grasping surface 123 in the direction intersecting the extending direction of each finger 12, is placed capable of detecting approach and separation of an object (for example, an obstacle in the surrounding environment) with respect to the surface 127 opposite to the grasping surface 123. This second auxiliary proximity sensor unit 17, for example, make it possible more accurately to calculate the positional relationship between each finger 12 and an obstacle in the surrounding environment.

The first and second auxiliary proximity sensor units 16 and 17 may be configured by any type of proximity sensor such as a capacitive type, an optical type, an inductive type, a magnetic type, and an ultrasonic type, similarly to the proximity sensor unit 13. In a case where the first and second auxiliary proximity sensor units 16 and 17 are constituted as a capacitive type, they can be configured by one or more capacitive sensors including electrodes having an arbitrary shape. A detection results detected by the first and second auxiliary proximity sensor units 16 and 17 are output to, for example, the control device 100.

Next, the control device 100 of the end effector device 1 will be described.

The control device 100 includes a CPU that performs calculations and the like, a storage medium such as a ROM or RAM that stores a program or data necessary for controlling the end effector 10, and an interface unit that performs signal input and output with the outside of the end effector device 1. As shown in FIG. 1, the control device 100 includes an approach position decision unit 110, a finger arrangement determination unit 120, a finger movement determination unit 130, and a movement control unit 140. Each of the approach position decision unit 110, the finger arrangement determination unit 120, the finger movement determination unit 130, and the movement control unit 140 is a function realized by the CPU executing a predetermined program.

Hereinafter, each part constituting the control device 100 will be described with reference to FIGS. 20 to 24, but, in FIGS. 20 to 24, among the components of the end effector device 1, only the end effector 10 is shown, and other components are omitted.

The approach position decision unit 110 decides an approach position P1 (see FIG. 22) that is further away from the object being grasped 60 than a grasping position P2 (see FIG. 24) described later in a palm approaching direction (that is, an arrow A direction in FIG. 21) in which the palm 11 of the end effector 10 approaches the object being grasped 60, the approach position P1 being a position of the proximity sensor unit 13 with respect to the object being grasped 60 in the palm approaching direction A. The approach position P1 is a position where the end effector 10 does not come into contact with the object 60 and the object 70 in the surrounding environment. The approach position P1 is decided according to a required movement time from the approach position P1 to the grasping position P2 of the end effector 10, a performance of each proximity sensor unit 13, a dimensional configuration of each finger 12, a shape and size of the object being grasped 60, or the like. As an example, the palm approaching direction substantially coincides with the extending direction of each finger 12 of the end effector 10.

The approach position decision unit 110 decides a speed change position P3 further away from the object being grasped 60 than the approach position P1 in the palm approaching direction A. The speed change position P3 is a position where a first movement speed is changed by the movement control unit 140 to a second movement speed, which is smaller than the first movement speed, when the palm 11 is made to approach the object being grasped 60 and moved to the approach position P1, the first movement speed being a movement speed of the palm 11 between the speed change position P3 and a position P0 further away from the object being grasped 60 than the speed change position P3. This speed change position P3 is decided according to a required movement time from the approach position P1 of the end effector 10 to the grasping position P2, a performance of the drive device 30, a dimensional configuration of each finger 12, a shape and size of the object being grasped 60, or the like.

Each of the approach position P1, the speed change position P3, the first movement speed, and the second movement speed may be decided by an input of the user, may be decided by the approach position decision unit 110 selecting a value from among a plurality of values stored in advance, or may be decided by the approach position decision unit 110 correcting a value decided by the input of the user or selected by the approach position decision unit 110 based on a detection result detected by the proximity sensor unit 13. The second movement speed is decided according to a required movement time from the approach position P1 to the grasping position P2 of the end effector 10 within a range in which the end effector 10 can be stopped at the approach position P1.

The finger arrangement determination unit 120 performs arrangement determination on whether the end effector 10 can be placed without contacting the object 70 at the grasping position P2 (see FIG. 24), which is around a direction in which the palm 11 approaches the object being grasped 60 in the object being grasped 60 and at which all the plurality of fingers 12 are positioned in a space 80 between the object being grasped 60 and the object 70 in the surrounding environment based on a detection result detected by the proximity sensor unit 13, when the object being grasped 60 is grasped with the end effector 10. The arrangement determination is performed for each finger 12 at the approach position P1 as an example. The grasping position P2 is a position where the object being grasped 60 can be grasped by making each finger 12 perform a grasping operation. The grasping position P2 is decided in advance based on, for example, a dimensional configuration of each finger 12 of the end effector 10, a size of the object being grasped 60, or the like.

For example, the finger arrangement determination unit 120 calculates a distance from the decided approach position P1 in the palm approaching direction A to the object being grasped 60 based on information such as a shape and size of the object being grasped 60 input in advance. Then, the finger arrangement determination unit 120 calculates a positional relationship between each finger 12 and the object being grasped 60 in a direction orthogonal to the palm approaching direction A and a positional relationship between each finger 12 and the object 70 in the surrounding environment in a direction orthogonal to the palm approaching direction A based on the information on the dimensional configuration of each finger 12, the calculated distance, and the detection result detected by the proximity sensor unit 13 of each finger 12. As a result, the finger arrangement determination unit 120 determines whether each finger 12 can be inserted into the space 80 between the object being grasped 60 and the object 70 in the surrounding environment without contacting the object being grasped 60 and the object 70 in the surrounding environment. This determination is made, for example, before the end effector 10 is moved to the approach position P1, and after the end effector 10 is moved to the approach position P1 and before the end effector 10 is moved to the grasping position P2.

When an unarrangeable determination, which indicates that each of the plurality of fingers 12 cannot be placed at the grasping position P2 without contacting the object being grasped 60 and the object 70 in the surrounding environment, is made for some of the plurality of fingers 12 in the arrangement determination, the finger arrangement determination unit 120 performs, after a first movement described later is performed by the movement control unit 140, first rearrangement determination on whether the finger 12, for which the arrangeable determination has been made before the first movement, can be placed at the grasping position P2 without contacting the object being grasped 60 or the object 70 in the surrounding environment after the first movement. The first rearrangement determination is made in the same manner as the arrangement determination.

When rearrangeable determination indicating that the finger 12, for which the arrangeable determination has been made before the first movement, can be placed at the grasping position P2 after the first movement is made in the first rearrangement determination, the finger arrangement determination unit 120 performs second rearrangement determination on whether the finger 12, for which the unarrangeable determination has been made before the first movement, can be placed at the grasping position P2 without contacting the object being grasped 60 or the object 70 in the surrounding environment after the first movement. The second rearrangement determination is performed in the same manner as the arrangement determination.

The finger arrangement determination unit 120 performs the arrangement determination each time the movement control unit 140 moves each finger 12 at the approach position P1, for example.

The finger movement determination unit 130 performs movement determination on whether each of the plurality of fingers 12 can be moved in a direction intersecting the extending direction of each finger 12 so that the object being grasped 60 can be placed between the grasping surfaces 123 of the plurality of fingers 12, when the unarrangeable determination is made in the arrangement determination or the second rearrangement determination performed by the finger arrangement determination unit 120. The finger movement determination unit 130 determines that the object being grasped 60 cannot be grasped when unmovable determination is made in this movement determination, the unmovable determination indicating that each of the plurality of fingers 12 cannot be moved in the direction intersecting the extending direction of each finger 12 so that the object being grasped 60 can be placed between the grasping surfaces 123 of the plurality of fingers 12.

Figure 21:
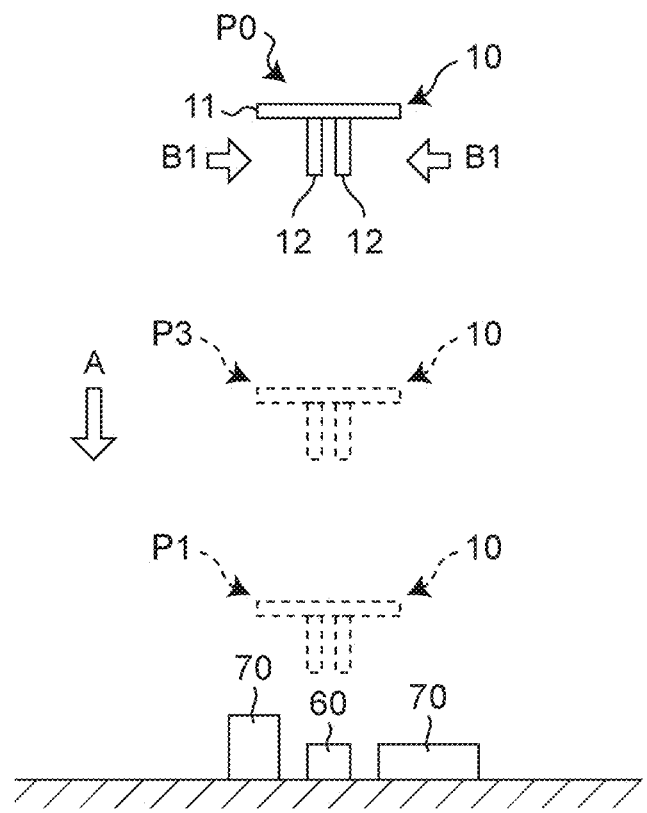
FIG. 21 is a second schematic diagram for illustrating each part constituting the control device of the end effector device of FIG. 1.
Figure 22:
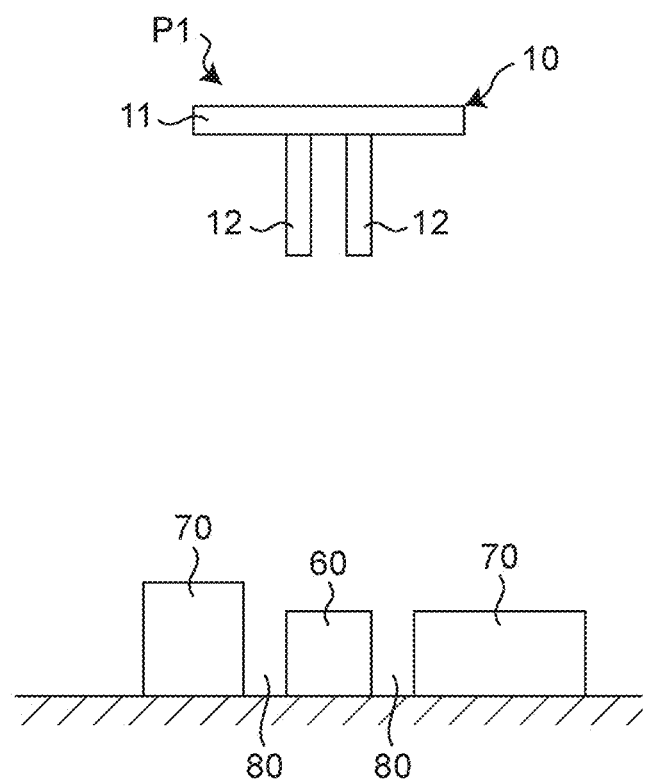
FIG. 22 is a third schematic diagram for illustrating each part constituting the control device of the end effector device of FIG. 1.
Figure 23:
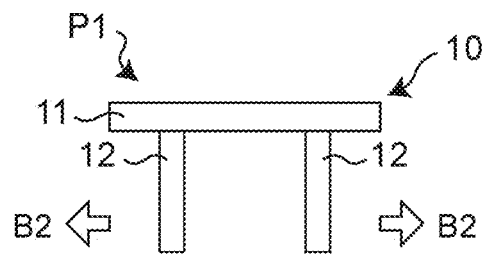
FIG. 23 is a fourth schematic diagram for illustrating each part constituting the control device of the end effector device of FIG. 1.
Figure 23:
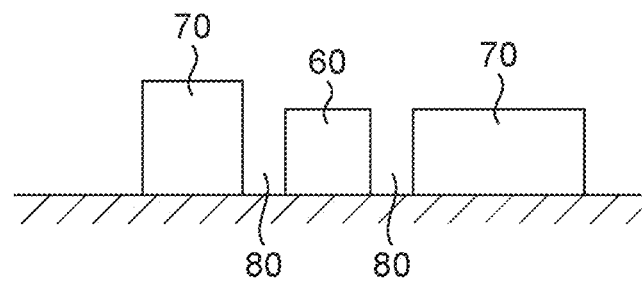
Figure 24:
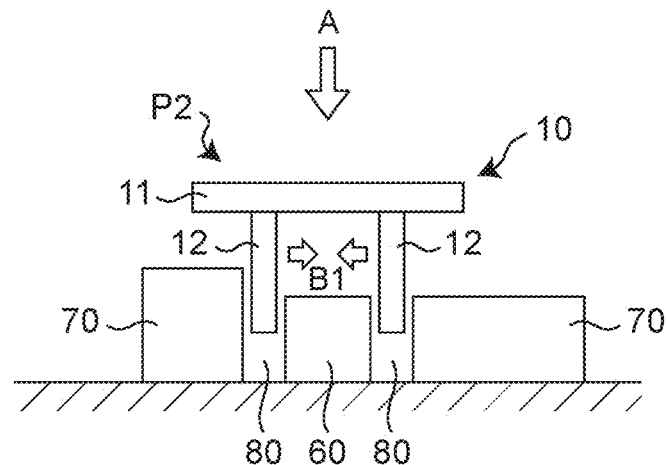
FIG. 24 is a fifth schematic diagram for illustrating each part constituting the control device of the end effector device of FIG. 1.

In this embodiment, as shown in FIG. 21, the end effector 10 is moved to the approach position P1 in a state where each of the plurality of fingers 12 is made to approach each other and closed in a grasping direction B1 (that is, in a direction intersecting the extending direction of each finger 12 as well as approaching each other). Therefore, when the unarrangeable determination is made in the arrangement determination, the movement control unit 140 decides a direction in which each of the plurality of fingers 12 is separated from each other as a movement direction of the plurality of fingers 12, and moves each of the plurality of fingers 12 in a stepwise manner along the decided direction. That is, when the plurality of fingers 12 cannot move in a direction decided by the movement control unit 140 with the arrangeable determination not made, the unmovable determination is made.

The movement control unit 140 controls the drive device 30 based on results of determinations performed by the approach position decision unit 110, the finger arrangement determination unit 120, and the finger movement determination unit 130, to drive the palm 11 and each finger 12.

For example, in a movement process of the end effector 10 to the approach position P1 (hereinafter referred to as the first approach process), the movement control unit 140 drives the palm 11 and each finger as follows.

The movement control unit 140, when moving the end effector 10 from a position further away from the object being grasped 60 than the approach position P1 (for example, the position P0 shown in FIGS. 20 and 21) to the object being grasped 60 in the palm approaching direction A, determines whether the end effector 10 has moved to the approach position P1 based on a detection result detected by the proximity sensor unit 13. If it is determined that the end effector 10 has moved to the approach position P1, the movement control unit 140 stops the movement of the end effector 10. At this time, as shown in FIG. 21, the movement control unit 140 moves the end effector 10 to the approach position P1 in a state where each of the plurality of fingers 12 is made to approach each other and closed in the grasping direction B1. Whether the end effector 10 has moved to the approach position P1 is decided based on a distance to the object being grasped 60 in the palm approaching direction A detected by the proximity sensor unit 13.

When the finger arrangement determination unit 120 determines that the position of the object being grasped 60 with respect to the end effector 10 in the palm approaching direction A cannot be calculated before the end effector 10 is moved to the approach position P1, the movement control unit 140 moves the palm 11 in a direction intersecting (for example, orthogonal to) the palm approaching direction A until it is determined that the position of the object being grasped 60 with respect to the end effector 10 in the palm approaching direction A can be calculated.

The movement control unit 140, when moving the palm 11 closer to the object being grasped 60 in the palm approaching direction A to move the end effector 10 to the approach position P1, determines whether the object being grasped 60 and the object 70 in the surrounding environment can come into contact with the palm 11 and each finger 12 based on a detection result detected by the proximity sensor unit 13. When it is determined that the object being grasped 60 and the object 70 in the surrounding environment can come into contact with the palm 11 and each finger 12, the movement control unit 140 stops the palm 11 from moving closer to the object being grasped 60 in the palm approaching direction A. The movement control unit 140 determines whether the end effector 10 has moved to the speed change position P3 (see FIG. 21) further away from the object being grasped 60 than the approach position P1 based on a detection result detected by the proximity sensor unit 13. When it is determined that the end effector 10 has moved to the speed change position P3, the movement control unit 140 changes the first movement speed, which is the movement speed of the end effector 10 between the speed change position P3 and the position P0 (shown in FIG. 21) further away from the object being grasped 60 than the speed change position P3, to the second movement speed which is smaller than the first movement speed.

For example, in a movement process of the end effector 10 to the grasping position P2 (hereinafter referred to as the second approach process), the movement control unit 140 drives the palm 11 and each finger as follows. The second approach process is performed after the completion of the first approach process.

When the arrangeable determination is made in the arrangement determination or the second rearrangement determination, the movement control unit 140 controls the drive device 30 to insert each finger 12 into a space 80 between the object being grasped 60 and the object 70 in the surrounding environment without contacting the object being grasped 60 and the object 70 in the surrounding environment and to move the end effector 10 to the grasping position P2, while moving the palm 11 closer to the object being grasped 60 in the palm approaching direction A.

When the unarrangeable determination is made for all or some of the fingers 12 in the arrangement determination, the movement control unit 140 controls the drive device 30 to perform a first movement that moves all of the plurality of fingers 12 in a direction intersecting (for example, orthogonal to) the extending direction of each finger 12. In the first movement of this embodiment, the movement control unit 140 moves each finger 12 away from each other in a direction B2 and opens each finger 12 in a direction intersecting the extending direction of each finger 12.

When the unarrangeable determination is made in the first rearrangement determination, the movement control unit 140 performs a second movement that moves the palm 11 in a direction intersecting the palm approaching direction A so that the finger 12 for which the unarrangeable determination has been made before the first rearrangement determination is performed is away from the object being grasped 60 in the direction intersecting the extending direction of the finger 12 (that is, in the same direction as the direction B2 in which the finger 12 for which the unarrangeable determination has been made before the first rearrangement determination is performed moved in the first movement).

Whether the end effector 10 has reached the approach position P1, the grasping position P2, and the speed change position P3 is determined based on, for example, a detection result (that is, a distance from each proximity sensor unit 13 to the object being grasped 60) detected by the proximity sensor unit 13 closest to the object being grasped 60 in the palm approaching direction A among the plurality of proximity sensor units 13. In this embodiment, since the proximity sensor unit 13 of each finger 12 is placed so that the distance to the object being grasped 60 in the extending direction of each finger 12 is substantially the same, any proximity sensor unit 13 may be used to determine whether the end effector 10 has reached the respective positions P1, P2, and P3.

The first auxiliary proximity sensor unit 16 may be used to determine whether the end effector 10 has reached the grasping position P2. For example, when the first auxiliary proximity sensor unit 16 recognizes the object being grasped 60, the movement control unit 140 determines that the end effector 10 has reached the grasping position P2.

Subsequently, the first approach process and the second approach process will be described with reference to FIGS. 25 to 27. It should be noted that these processes described below are performed by the control device 100 executing a predetermined program. In the first approach process and the second approach process, the amount of movement of each finger 12 in the directions B1 and B2 of approaching or separating from each other is assumed to be a minute amount (for example, 1 mm).

(First Approach Process)

Figure 25:
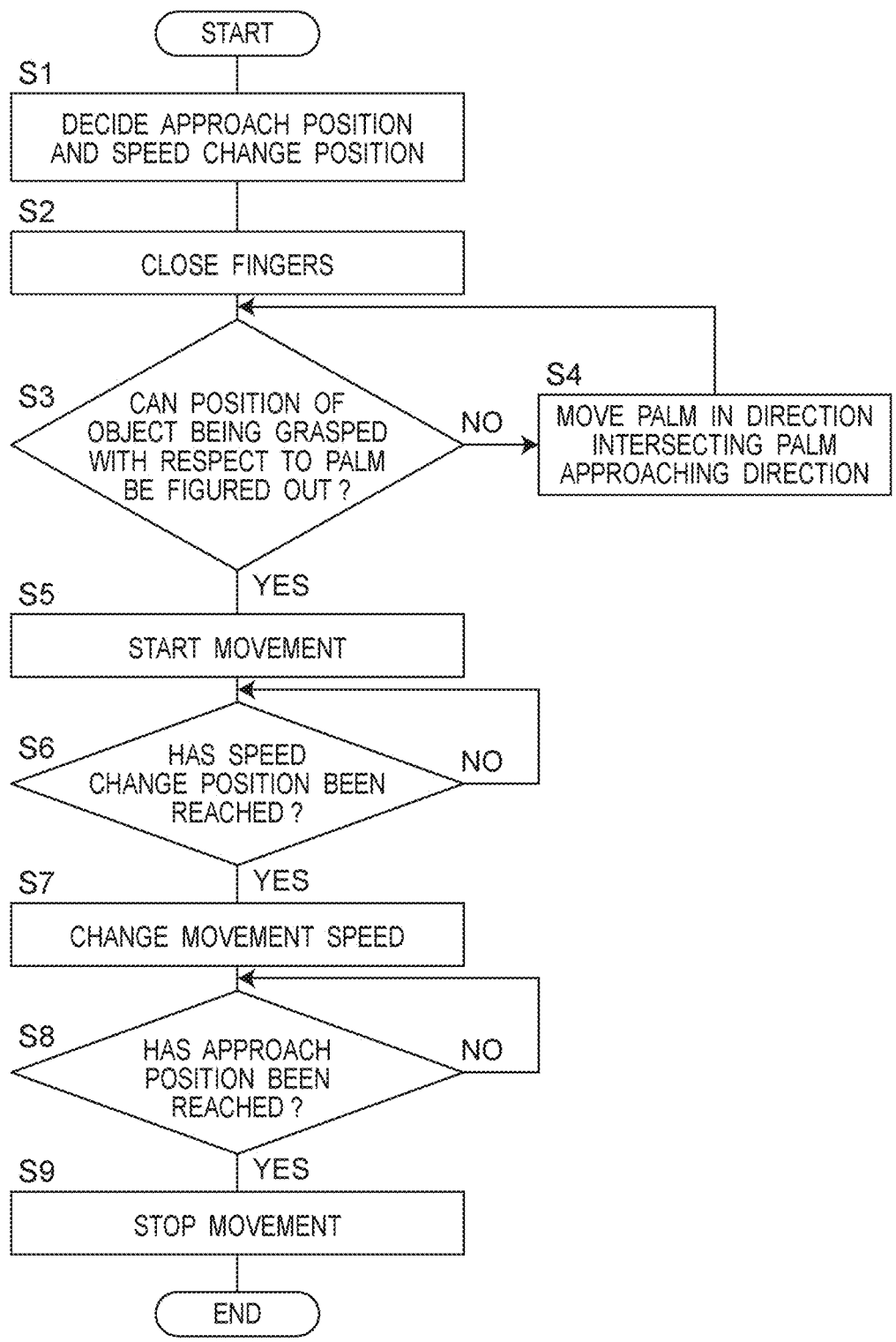
FIG. 25 is a flowchart for describing a first approach process of the end effector device of FIG. 1.

As shown in FIG. 25, when the first approach process is started, the approach position decision unit 110 decides the approach position P1 and the speed change position P3, and decides the first movement speed and the second movement speed (step S1).

When the approach position P1 and the speed change position P3 are decided, the movement control unit 140 makes each of the plurality of fingers 12 of the end effector 10 approach each other and closes each finger 12 in the grasping direction B1 (step S2), and starts detection by the proximity sensor unit 13. When the detection by the proximity sensor unit 13 is started, the finger arrangement determination unit 120 determines whether a position of the object being grasped 60 with respect to the palm 11 in the palm approaching direction A can be calculated based on a detection result detected by the proximity sensor unit 13 (step S3).

When it is determined that the position of the object being grasped 60 with respect to the end effector 10 in the palm approaching direction A cannot be calculated, the movement control unit 140 moves the palm 11 in a direction intersecting the palm approaching direction A (step S4) and repeats steps S3 and S4 until it is determined that the position of the object being grasped 60 with respect to the end effector 10 in the palm approaching direction A can be calculated.

When it is determined that the position of the object being grasped 60 with respect to the palm 11 in the palm approaching direction A can be calculated, the movement control unit 140 makes the palm 11 approach the object being grasped 60 in the palm approaching direction A to start movement of the end effector 10 to the approach position P1 (step S5).

When the movement of the end effector 10 to the approach position P1 is started, the movement control unit 140 first determines whether the end effector 10 has reached the speed change position P3, while determining whether the object being grasped 60 and the object 70 in the surrounding environment can come into contact with the palm 11 and each finger 12 based on a detection result detected by the proximity sensor unit 13 (step S6). This step S6 is repeated until the end effector 10 reaches the speed change position P3. When it is determined that the object being grasped 60 and the object 70 in the surrounding environment can come into contact with the palm 11 and each finger 12, the movement control unit 140 stops the palm 11 from moving closer to the object being grasped 60 in the palm approaching direction A.

When it is determined that the end effector 10 has reached the speed change position P3, the movement control unit 140 changes the movement speed of the end effector 10 from the first movement speed to the second movement speed smaller than the first movement speed (step S7).

When the movement speed of the end effector 10 is changed from the first movement speed to the second movement speed, the movement control unit 140 determines whether the end effector 10 has reached the approach position P1 based on a detection result detected by the proximity sensor unit 13 (step S8). This step S8 is repeated until the end effector 10 reaches the approach position P1.

When it is determined that the end effector 10 has reached the approach position P1, the movement control unit 140 stops the movement of the end effector 10 (step S9), and the first approach process terminates.

As described above, the end effector device 1 includes the end effector 10 including the plurality of fingers 12, each finger 12 being provided with the proximity sensor unit 13, the drive device 30 that drives the palm 11 and each finger 12 of the end effector 10, the movement control unit 140 that makes the palm 11 approach the object being grasped 60, and the approach position decision unit 110 that decides the approach position P1 further away from the object being grasped 60 in the palm approaching direction A than the grasping position P2 which is around the palm approaching direction A in the object being grasped 60 and at which all of the plurality of fingers 12 are positioned between the object being grasped 60 and the object 70 in the surrounding environment and the object being grasped 60 can be grasped by the grasping operation. In the end effector device 1, the movement control unit 140 stops the palm 11 from moving closer to the object being grasped 60 based on a detection result detected by the proximity sensor unit 13, when the object being grasped 60 and the object 70 in the surrounding environment can come into contact with the palm 11 and each finger 12. With such a configuration, it is possible to realize the end effector device 1 capable of moving the end effector 10 to an approach position without contacting the object being grasped 60 and the object 70 in the surrounding environment.

The movement control unit 140 moves the end effector 10 to the approach position P1 in a state where each finger 12 approaches each other and closes in the direction intersecting the extending direction thereof. With such a configuration, since the proximity sensor unit 13 of each finger 12 can be used as an array, it is possible more accurately to detect approach or separation of the object being grasped 60 and the object 70 in the surrounding environment with respect to the end effector 10 in the palm approaching direction A.

Before the end effector 10 approaches the object being grasped 60, the movement control unit 140 determines whether a position of the object being grasped 60 with respect to the end effector 10 in the palm approaching direction A can be calculated based on a detection result detected by the proximity sensor unit 13. When it is determined that the position of the object being grasped 60 with respect to the end effector 10 in the palm approaching direction A cannot be calculated, the movement control unit 140 moves the end effector 10 in the direction B intersecting the palm approaching direction A until it is determined that the position of the object being grasped 60 with respect to the end effector 10 in the palm approaching direction A can be calculated. With such a configuration, the end effector 10 can be moved more accurately toward the object being grasped 60.

While making the end effector 10 approach the object being grasped 60 to move the end effector 10 to the approach position P1, the movement control unit 140 changes the first movement speed, which is the movement speed of the end effector 10 between the speed change position P3 and the position P0 further away from the object being grasped 60 than the speed change position P3, to the second movement speed smaller than the first movement speed, when the end effector 10 moves to the speed change position P3 further away from the object being grasped 60 than the approach position P1 in the palm approaching direction A. With such a configuration, it is possible more reliably to avoid unintended contact of the end effector 10 with respect to the object being grasped 60 when the end effector 10 is moved to the approach position P1.

In the first approach process, steps S2 to S7 may be omitted if necessary. That is, when the end effector 10 is moved to the approach position P1, it may not close each finger 12, or it may not determine whether the position of the object being grasped 60 with respect to the palm 11 in the palm approaching direction A can be calculated, or it may not change a movement speed of the end effector 10. Any one or more of steps S2 to S7 may be omitted, or all of steps S2 to S7 may be omitted.

For example, in a case where step S3 of the first approach process is omitted, the end effector device 1 may be configured to calculate a position of the object being grasped 60 with respect to the palm 11 by using an image sensor.

The proximity sensor unit 13 may be provided at at least one of the plurality of fingers 12, and is not limited to the case where the proximity sensor unit 13 is provided at each of the plurality of fingers 12.

The number of speed change positions P3 is not limited to one, and may be two or more. That is, when the end effector 10 is moved to the approach position P1, the speed of the end effector 10 may be changed at two or more points. The speed change position P3 may be the same position as the approach position P1 (that is, P1=P3). In this case, step S6 and step S7 are omitted in the first approach process, and the movement control unit 140 moves the end effector 10 in the second approach process at a speed equal to or slower than a movement speed of the end effector 10 in the first approach process.

In step S3, when it is determined that the position of the object being grasped 60 with respect to the end effector 10 in the palm approaching direction A cannot be calculated, the first approach process may be terminated at that point, without repeating step 6 until it is determined that the position of the object being grasped 60 with respect to the end effector 10 in the palm approaching direction A can be calculated.

(Second Approach Process)

Figure 26:
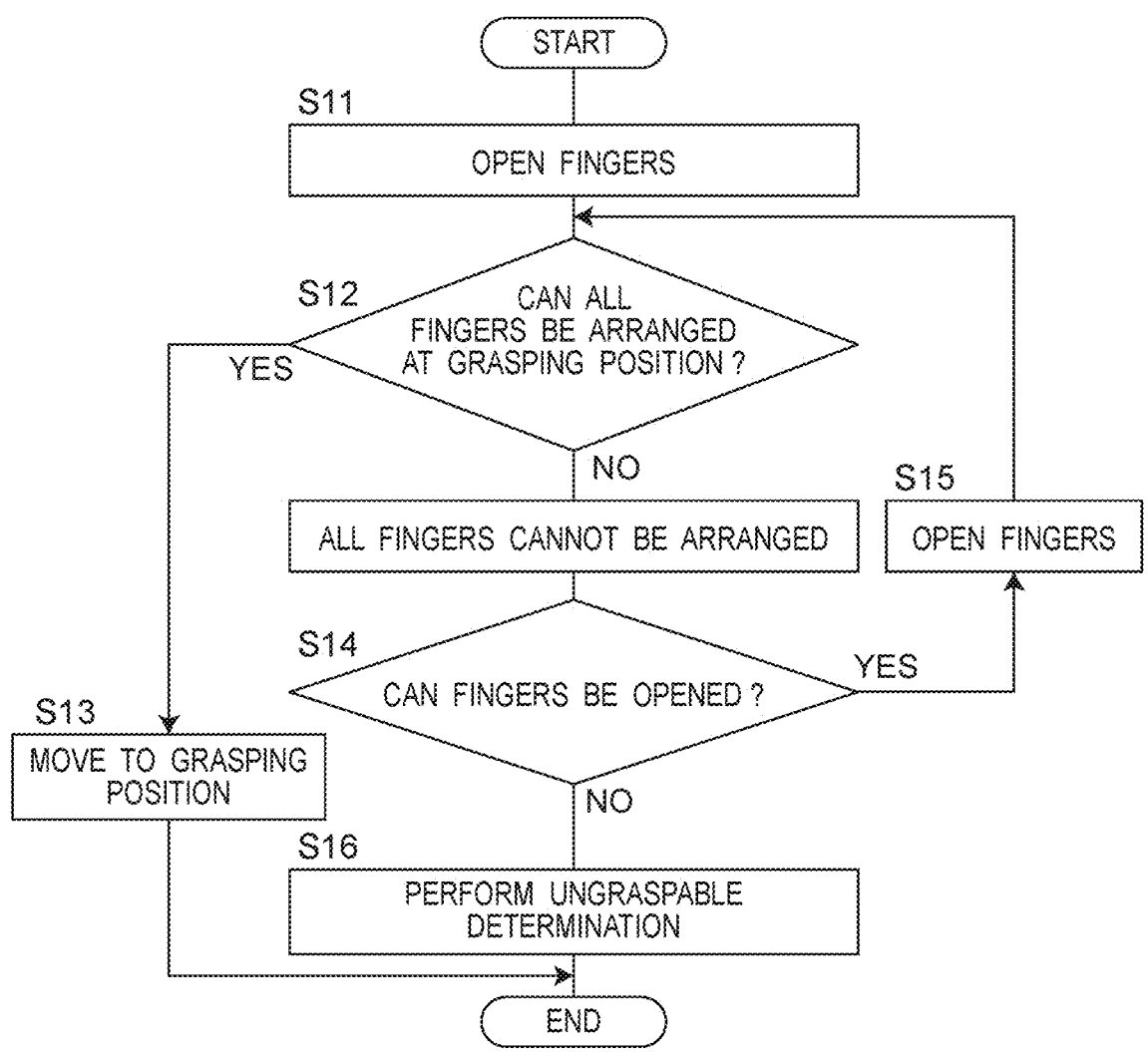
FIG. 26 is a first flowchart for describing a second approach process of the end effector device of FIG. 1.
Figure 27:
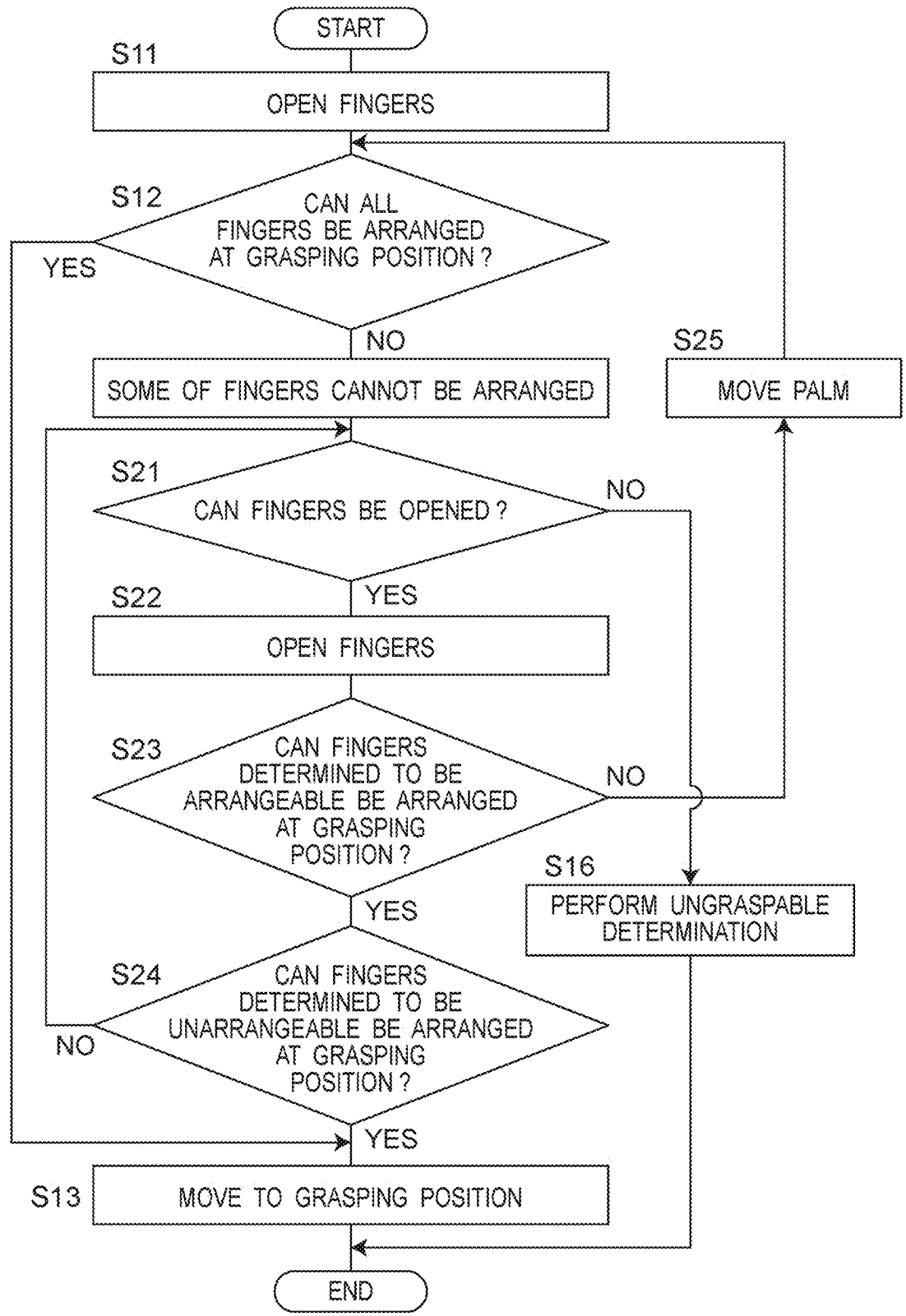
FIG. 27 is a second flowchart for describing the second approach process of the end effector device of FIG. 1.

As shown in FIGS. 26 and 27, in the second approach process, the movement control unit 140 moves each of the plurality of fingers 12 of the end effector 10 in a direction B2 separating from each other and opens each finger 12 based on input information of the object being grasped 60 (step S11), and then the finger arrangement determination unit 120 performs arrangement determination on whether all the fingers 12 can be arranged at the grasping position P2 (step S12). In this arrangement determination, FIG. 26 shows processing when unarrangeable determination is made for all the fingers 12, and FIG. 27 shows processing when the unarrangeable determination is made for some of the plurality of fingers 12.

For example, in a case where the first approach process is performed with each finger 12 opened without being closed, the movement control unit 140 is configured, in step S11, to move each finger 12 in the grasping direction B1 in which the fingers 12 approach each other in a stepwise manner and to close each finger 12.

As shown in FIG. 26, when the arrangeable determination is made for all the fingers 12 in the arrangement determination in step S12, the movement control unit 140 moves the end effector 10 to the grasping position P2 (step S13), and the second approach process terminates.

When the unarrangeable determination is made for all the fingers 12 in the arrangement determination in step S12, the finger movement determination unit 130 performs movement determination on whether each finger 12 can be moved in a direction away from each other and opened (step S14). When movable determination indicating that each finger 12 can be moved in the direction B2 away from each other and opened is made in this movement determination, the movement control unit 140 moves each finger 12 in the direction B2 away from each other and opens each finger 12 (step S15) and returns to step S12, and the finger arrangement determination unit 120 performs the arrangement determination again.

When the unmovable determination indicating that each finger 12 cannot be moved in the direction B2 away from each other and opened is made by the movement determination, the finger movement determination unit 130 determines that the object being grasped 60 cannot be grasped (step S16), and the second approach process terminates.

As shown in FIG. 27, when the unarrangeable determination is made for some of the fingers 12 in the arrangement determination in step S12, the finger movement determination unit 130 performs movement determination on whether each finger 12 can be moved in a direction away from each other and opened (step S21). When the movable determination is made in this movement determination, the movement control unit 140 performs the first movement that moves each finger 12 in the direction B2 away from each other and opens each finger 12 (step S22).

When the first movement is performed, the finger arrangement determination unit 120 performs first rearrangement determination on whether each finger 12, for which the arrangeable determination has been made before the first movement, can be placed at the grasping position P2 without contacting the object being grasped 60 or the object 70 in the surrounding environment after the first movement (step S23). When the arrangeable determination is made in the first rearrangement determination, the finger arrangement determination unit 120 performs second rearrangement determination on whether or not each finger 12, for which the unarrangeable determination has been made before the first movement, can be placed at the grasping position P2 without contacting the object being grasped 60 or the object 70 in the surrounding environment after the first movement (step S24).

When the arrangeable determination is made in the second rearrangement determination, or when the arrangeable determination is made for all the fingers 12 in step S12 and step S24, the movement control unit 140 moves the end effector 10 to the grasping position P2 (step S13), and the second approach process terminates.

When the unmovable determination is made in the movement determination in step S21, the finger movement determination unit 130 determines that the object being grasped 60 cannot be grasped (step S16), and the second approach process terminates.

When the unarrangeable determination is made in the first rearrangement determination in step S23, the movement control unit 140 performs the second movement that moves the palm 11 in the direction intersecting the palm approaching direction A so that the finger 12, for which the unarrangeable determination has been made before the first rearrangement determination is performed, is away from the object being grasped 60 in the direction intersecting the extending direction of the finger 12 (step S25). This is because it is highly possible that the finger 12, for which the arrangeable determination has been made in the arrangement determination and the unarrangeable determination has been made in the first rearrangement determination, has moved from a position above the space 80 between the object being grasped 60 and the object 70 in the surrounding environment to a position above the object 70 in the surrounding environment. When the second movement is performed, the process returns to step S12, and the finger arrangement determination unit 120 performs the arrangement determination again.

When the unarrangeable determination is made in the second rearrangement determination in step S24, the process returns to step S21, and the finger movement determination unit 130 performs the movement determination again.

In step S11, when each finger 12 is moved in the grasping direction B1 in which the fingers 12 approach each other in a stepwise manner and closed, in step S25, the second movement is performed so that the finger 12, for which the unarrangeable determination has been made before the first rearrangement determination is performed, approaches the object being grasped 60 in the direction intersecting the extending direction of the finger 12. This is because it is highly possible that the finger 12, for which the arrangeable determination has been made in the arrangement determination and the unarrangeable determination has been made in the first rearrangement determination, has moved from a position above the space 80 between the object being grasped 60 and the object 70 in the surrounding environment to a position above the object being grasped 60.

As described above, the end effector device 1 includes the end effector 10 including the plurality of fingers 12, each finger 12 being provided with the proximity sensor unit 13, the drive device 30 that drives the palm 11 and each finger 12 of the end effector 10, the finger arrangement determination unit 120 that performs the arrangement determination on whether each of the plurality of fingers 12 can be placed at the grasping position P2 without contacting the object being grasped 60 and the object 70 in the surrounding environment, and the movement control unit 140 that moves the end effector 10 to the grasping position P2 when the arrangeable determination is made in the arrangement determination, and moves each finger 12 in the direction intersecting the extending direction thereof when the unarrangeable determination is made in the arrangement determination. With such a configuration, it is possible to realize the end effector device 1 capable of arranging the object being grasped 60 at a position where the object being grasped 60 can be grasped (that is, the grasping position P2) without contacting the object being grasped 60 and an object in the surrounding environment.

When the first movement that moves all of the plurality of fingers 12 in the direction intersecting the extending direction thereof when the unarrangeable determination is made for some of the plurality of fingers 12 in the arrangement determination is performed by the movement control unit 140, the finger arrangement determination unit 120 performs rearrangement determination on whether the finger 12, for which the arrangeable determination has been made before the first movement, can be placed at the grasping position P2 without contacting the object being grasped 60 or the object 70 in the surrounding environment after the first movement. When the unarrangeable determination is made in the rearrangement determination, the movement control unit 140 performs the second movement that moves the palm 11 in the direction intersecting the palm approaching direction A so that the finger 12, for which the unarrangeable determination has been made before the rearrangement determination is performed, approaches or separates with respect to the object being grasped 60 in the direction intersecting the extending direction thereof. With such a configuration, it is possible to reduce a driving amount of the arm 20 when the end effector 10 moves to the grasping position P2.

The finger movement determination unit 130 is further provided that performs, when the unarrangeable determination is made in the arrangement determination, movement determination on whether each of the plurality of fingers 12 can be moved in a direction intersecting the extending direction thereof so that the object being grasped 60 can be placed between the plurality of fingers 12. The finger movement determination unit 130 determines that the object being grasped 60 cannot be grasped when the unmovable determination is made by the movement determination. With such a configuration, it is possible accurately and quickly to determine whether the object being grasped 60 can be grasped.

In the second approach process, steps S16 and S25 can be omitted. That is, the finger movement determination unit 130 may be omitted, or the second movement may not be performed when the unarrangeable determination is made in the first rearrangement determination.

When the arrangement determination is performed in step S12, and the unarrangeable determination is made for some of the fingers 12, the palm 11 may be moved in a direction intersecting the palm approaching direction A so that the finger 12 for which the arrangeable determination is made approaches the object being grasped 60 without performing the first movement in step S22. With such a configuration, the second approach process can be simplified and the load on the control device 100 can be reduced.

As described above, various embodiments of the present disclosure have been described in detail with reference to the drawings, and finally, various aspects of the present disclosure will be described. It is to be noted that in the following description, description will be provided with reference numerals attached thereto as an example.

The end effector 10 of the first aspect of the present disclosure includes:

a palm 11; and a plurality of fingers 12 capable of moving in a direction intersecting an extending direction of each of fingers as well as approaching each other and grasping an object being grasped 60, each of which includes a proximal end portion 121 in an extending direction thereof connected to the palm 11, wherein at least one of the plurality of fingers 12 includes a proximity sensor unit 13 that is provided at a tip portion 122 in the extending direction, the proximity sensor unit 13 being placed capable of detecting approach and separation of the proximity sensor unit 13 with respect to an object in the extending direction and capable of detecting approach and separation of the object with respect to the proximity sensor unit 13 in the extending direction, and the proximity sensor unit 13 includes a frame-shaped detection region 14 that covers an edge of the tip portion 122 when viewed from the extending direction.

According to the end effector 10 of the first aspect, with the proximity sensor unit 13, it is possible to realize the end effector 10 capable of detecting approach and separation of an object (for example, the object being grasped 60 or an object in the surrounding environment) with respect to the tip portion 122 of each finger 12 in the extending direction of each finger 12, and capable of detecting approach and separation of the tip portion 122 of each finger with respect to an object in the extending direction of each finger 12.

In the end effector 10 of the second aspect of the present disclosure, the proximity sensor unit 13 is configured by a capacitive proximity sensor.

According to the end effector 10 of the second aspect, it is possible to detect approach and separation of an object with respect to the tip portion 122 of each finger 12 in the extending direction of each finger 12, and detect approach and separation of the tip portion 122 of each finger with respect to the object in the extending direction of each finger 12, with a simple configuration.

In the end effector 10 of the third aspect of the present disclosure, the proximity sensor unit 13 includes a frame-shaped electrode 131 placed at the edge of the tip portion 122 when viewed from the extending direction.

According to the end effector 10 of the third aspect, it is possible, with a simple configuration, to detect approach and separation of an object with respect to the tip portion 122 of each finger 12 in the extending direction of each finger 12, and to detect approach and separation of the tip portion 122 of each finger with respect to the object in the extending direction of each finger 12.

In the end effector 10 of the fourth aspect of the present disclosure, the proximity sensor unit 13 is configured by a plurality of electrodes 131.

According to the end effector 10 of the fourth aspect, the proximity sensor unit 13 can be configured by a plurality of self-capacitive proximity sensors or one or more mutual-capacitive proximity sensors. For example, when the proximity sensor unit 13 is configured by a plurality of self-capacitive proximity sensors, the number of surface pixels in the detection region 14 can be increased and, therefore, when the edge portion of the object being grasped 60 or the object 70 in the surrounding environment is positioned in the detection region 14, it is possible to determine in which direction each finger 12 should be moved to avoid contact with the object being grasped 60 or the object 70 in the surrounding environment.

In the end effector 10 of the fifth aspect of the present disclosure, each of the plurality of fingers 12 includes a grasping surface 123 facing the object being grasped 60 in a direction intersecting the extending direction, the grasping surface 123 being capable of grasping the object being grasped 60, and the plurality of electrodes 131 are arranged symmetrically with respect to the centerline CL that is orthogonal to the grasping surface 123 and passes through the center of the grasping surface 123 when viewed from the extending direction.

According to the end effector 10 of the fifth aspect, it is possible to make a design of the end effector 10 easier.

In the end effector 10 of the sixth aspect of the present disclosure, each of the plurality of fingers 12 includes a grasping surface 123 facing the object being grasped 60 in a direction intersecting the extending direction, the grasping surface 123 being capable of grasping the object being grasped 60, and at least one of the plurality of fingers 12 includes an auxiliary proximity sensor unit 16 provided on the grasping surface 123, the auxiliary proximity sensor unit 16 being placed capable of detecting approach and separation of the object being grasped 60 with respect to the grasping surface 123.

According to the end effector 10 of the sixth aspect, the auxiliary proximity sensor unit 16 makes it possible more accurately to calculate a positional relationship between the grasping surface 123 of each finger 12 and the object being grasped 50 when the object being grasped 50 is grasped.

In the end effector 10 of the seventh aspect of the present disclosure, each of the plurality of fingers 12 includes a grasping surface 123 facing the object being grasped 60 in a direction intersecting the extending direction, the grasping surface 123 being placed capable of grasping the object being grasped 60, and at least one of the plurality of fingers 12 includes an auxiliary proximity sensor unit 17 provided on a surface 127 opposite to the grasping surface 123 in the direction intersecting the extending direction, the auxiliary proximity sensor unit 17 being placed capable of detecting approach and separation of an object with respect to the surface 127 opposite to the grasping surface 123.

According to the end effector 10 of the seventh aspect, the auxiliary proximity sensor unit 17 can more accurately calculate, for example, a positional relationship between each finger 12 and an obstacle in the surrounding environment.

The end effector device 1 of the eighth aspect of the present disclosure includes the end effector 10 of the above aspect, a drive device 30 that drives the palm 11 and each of the plurality of fingers 12, and a control device 100 that controls the drive device 30 based on a detection result detected by the proximity sensor unit 13.

According to the end effector device 1 of the eighth aspect, with the end effector 10, it is possible to realize the end effector device 1 capable of detecting approach and separation of an object with respect to the tip portion 122 of each finger 12 in the extending direction of each finger 12, and capable of detecting approach and separation of the tip portion 122 of each finger 12 with respect to the object in the extending direction of each finger 12.

Note that, by appropriately combining any of the above-described various embodiments or modifications, it is possible to achieve the effects of the respective embodiments or modifications. In addition, a combination of the embodiments or a combination of the examples or a combination of the embodiment and the example is possible, and a combination of the features in the different embodiments or the examples is also possible.

Although the present disclosure has been fully described in connection with preferred embodiments with reference to the accompanying drawings, various variations and modifications will be apparent to those skilled in the art. It is to be understood that such variations and modifications are included in the appended claims unless the variations and modifications depart from the scope of the present disclosure as set forth in the claims.

INDUSTRIAL APPLICABILITY

The end effector of the present disclosure can be applied to, for example, an end effector device of an industrial robot.

The end effector device of the present disclosure can be applied to, for example, an industrial robot.

REFERENCE SIGNS LIST 1. end effector device
10. end effector
11. palm
12. finger
121. proximal end portion
122. tip portion
123. grasping surface
124. tip surface
13. proximity sensor unit
131. electrode
14. first detection region
15. second detection region
16. first auxiliary proximity sensor unit
17. second auxiliary proximity sensor unit
20. arm
30. drive device
40. operation unit
50. power source
60. object being grasped
100. control device
110. approach position decision unit
120. finger arrangement determination unit
130. finger movement determination unit
140. movement control unit
CL. centerline
P1. approach position
P2. grasping position
P3. speed change position

The invention claimed is:

1. An end effector comprising:
a palm; and
a plurality of fingers capable of moving in a direction intersecting an extending direction of each of fingers as well as approaching each other and grasping an object being grasped, each of which includes a proximal end portion in an extending direction thereof connected to the palm, wherein
at least one of the plurality of fingers includes a proximity sensor unit provided at a tip portion in the extending direction, the proximity sensor unit being placed capable of detecting approach and separation of the proximity sensor unit with respect to an object in the extending direction and capable of detecting approach and separation of the object with respect to the proximity sensor unit in the extending direction,
the proximity sensor unit includes a detection region that covers at least two edges or sides opposing to each other of a periphery of the tip portion when viewed from the extending direction; and
the detection region covers only the at least two edges or sides when viewed from the extending direction.

2. The end effector according to claim 1, wherein the proximity sensor unit is configured by a capacitive proximity sensor.

3. The end effector according to claim 2, wherein the proximity sensor unit includes an electrode placed at the at least two edges of the tip portion when viewed from the extending direction.

4. The end effector according to claim 3 wherein, the proximity sensor unit is configured by a plurality of electrodes.

5. The end effector according to claim 4, wherein each of the plurality of fingers includes a grasping surface facing the object being grasped in a direction intersecting the extending direction, the grasping surface being placed capable of grasping the object being grasped, and
the plurality of electrodes are arranged symmetrically with respect to a center line that is orthogonal to the grasping surface and passes through a center of the grasping surface when viewed from the extending direction.

6. The end effector according to claim 2 wherein, the proximity sensor unit is configured by a plurality of electrodes.

7. The end effector according to claim 6, wherein each of the plurality of fingers includes a grasping surface placed facing the object being grasped in a direction intersecting the extending direction to be able to grasp the object being grasped, and the plurality of electrodes are arranged symmetrically with respect to a center line that is orthogonal to the grasping surface and passes through a center of the grasping surface when viewed from the extending direction.

8. The end effector according to claim 1, each of the plurality of fingers includes a grasping surface facing the object being grasped in a direction intersecting the extending direction, the grasping surface being placed capable of grasping the object being grasped, and at least one of the plurality of fingers includes an auxiliary proximity sensor unit provided on the grasping surface, the auxiliary proximity sensor unit being placed capable of detecting approach and separation of the object being grasped with respect to the grasping surface.

9. The end effector according to claim 1, each of the plurality of fingers includes a grasping surface facing the object being grasped in a direction intersecting the extending direction, the grasping surface being placed capable of grasping the object being grasped, and at least one of the plurality of fingers includes an auxiliary proximity sensor unit provided on a surface opposite to the grasping surface in a direction intersecting the extending direction, the auxiliary proximity sensor unit being placed capable of detecting approach and separation of an object with respect to the surface opposite to the grasping surface.

10. An end effector device comprising:

an end effector according to claim 1, a drive device that drives the palm and each of the plurality of fingers, and a control device that controls the drive device based on a detection result detected by the proximity sensor unit.

11. An end effector comprising:

a palm; and a plurality of fingers capable of moving in a direction intersecting an extending direction of each of fingers as well as approaching each other and grasping an object being grasped, each of which includes a proximal end portion in an extending direction thereof connected to the palm, wherein at least one of the plurality of fingers includes a proximity sensor unit provided at a tip portion in the extending direction, the proximity sensor unit being placed capable of detecting approach and separation of the proximity sensor unit with respect to an object in the extending direction and capable of detecting approach and separation of the object with respect to the proximity sensor unit in the extending direction, the proximity sensor unit includes a detection region that covers at least two edges or sides opposing to each other of a periphery of the tip portion when viewed from the extending direction, wherein the detection region covers only a perimeter of the tip portion when viewed from the extending direction.

12. The end effector according to claim 11, wherein the proximity sensor unit is configured by a capacitive proximity sensor.

13. The end effector according to claim 12, wherein the proximity sensor unit includes an electrode placed at the at least two edges of the tip portion when viewed from the extending direction.

14. The end effector according to claim 13 wherein, the proximity sensor unit is configured by a plurality of electrodes.

15. The end effector according to claim 14, wherein each of the plurality of fingers includes a grasping surface facing the object being grasped in a direction intersecting the extending direction, the grasping surface being placed capable of grasping the object being grasped, and the plurality of electrodes are arranged symmetrically with respect to a center line that is orthogonal to the grasping surface and passes through a center of the grasping surface when viewed from the extending direction.

16. The end effector according to claim 12 wherein, the proximity sensor unit is configured by a plurality of electrodes.

17. The end effector according to claim 16, wherein each of the plurality of fingers includes a grasping surface placed facing the object being grasped in a direction intersecting the extending direction to be able to grasp the object being grasped, and the plurality of electrodes are arranged symmetrically with respect to a center line that is orthogonal to the grasping surface and passes through a center of the grasping surface when viewed from the extending direction.

18. The end effector according to claim 11, each of the plurality of fingers includes a grasping surface facing the object being grasped in a direction intersecting the extending direction, the grasping surface being placed capable of grasping the object being grasped, and at least one of the plurality of fingers includes an auxiliary proximity sensor unit provided on the grasping surface, the auxiliary proximity sensor unit being placed capable of detecting approach and separation of the object being grasped with respect to the grasping surface.

19. The end effector according to claim 11, each of the plurality of fingers includes a grasping surface facing the object being grasped in a direction intersecting the extending direction, the grasping surface being placed capable of grasping the object being grasped, and at least one of the plurality of fingers includes an auxiliary proximity sensor unit provided on a surface opposite to the grasping surface in a direction intersecting the extending direction, the auxiliary proximity sensor unit being placed capable of detecting approach and separation of an object with respect to the surface opposite to the grasping surface.

20. An end effector device comprising:

an end effector according to claim 11, a drive device that drives the palm and each of the plurality of fingers, and a control device that controls the drive device based on a detection result detected by the proximity sensor unit.

\* \* \* \* \*